United States Patent [19]

Mülhaupt et al.

[11] Patent Number: 5,278,257

[45] Date of Patent: Jan. 11, 1994

[54] PHENOL-TERMINATED POLYURETHANE OR POLYUREA(URETHANE) WITH EPOXY RESIN

[75] Inventors: Rolf Mülhaupt, Marly, Switzerland; Jeremy H. Powell, Horseheath; Christopher S. Adderley, Hardwick, both of England; Werner Rüfenacht, Marly, Switzerland

[73] Assignee: Ciba-Geigy Corporation, Ardsley, N.Y.

[21] Appl. No.: 823,513

[22] Filed: Jan. 21, 1992

Related U.S. Application Data

[60] Division of Ser. No. 794,658, Nov. 15, 1991, abandoned, which is a continuation of Ser. No. 527,685, May 18, 1990, abandoned, which is a continuation of Ser. No. 233,298, Aug. 17, 1988, abandoned.

[30] Foreign Application Priority Data

Aug. 26, 1987 [CH] Switzerland ............ 3265/87
Mar. 21, 1988 [CH] Switzerland ............ 1069/88

[51] Int. Cl.$^5$ ............ C08L 9/02; C08L 63/02; C08L 75/02; C08L 75/08
[52] U.S. Cl. .................. 525/454; 525/65; 525/66; 525/68; 525/92; 525/93; 525/94; 525/107; 525/109; 525/127; 525/128; 525/129; 525/130; 525/131; 525/146; 525/147; 525/148; 525/150; 525/151; 525/423; 525/424; 525/426; 525/438; 525/439; 525/440; 525/445; 525/450; 525/453; 525/528
[58] Field of Search .......... 525/68, 65, 66, 92, 525/93, 94, 107, 109, 127, 128, 129, 130, 131, 146, 147, 148, 150, 151, 423, 424, 426, 438, 439, 440, 445, 450, 453, 454, 455, 528, 502

[56] References Cited

U.S. PATENT DOCUMENTS

| | | | |
|---|---|---|---|
| 3,855,177 | 12/1974 | Sandra, Jr. ............ | 525/528 |
| 4,390,679 | 6/1983 | Weiss et al. ............ | 525/459 |
| 4,683,283 | 7/1987 | Goel .................... | 528/93 |

Primary Examiner—Robert E. Sellers
Attorney, Agent, or Firm—JoAnn Villamizar; Luther A. R. Hall

[57] ABSTRACT

Compositions containing A) a copolymer based on at least one 1,3-diene and at least one polar, ethylenically unsaturated comonomer and B) a phenol-terminated polyurethane, polyurea or polyurea-urethane of the formula I

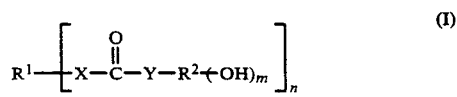

(I)

in which m is 1 or 2, n is 2 to 6, $R^1$ is the n-valent radical of an elastomeric prepolymer which is soluble or dispersible in epoxide resins, X and Y independently of one another are —O— or —$NR^3$—, it being necessary for one of these groups to be —$NR^3$—, $R^2$ is an m+1-valent radical of a polyphenol or aminophenol after the removal of the phenolic hydroxy group(s) or the amino group or both the amino group and the phenolic hydroxyl group, respectively, and $R^3$ is hydrogen, $C_1$-$C_6$alkyl or phenyl, are described.

Compounds containing the components A) and B) as well as an epoxide resin C) are also described.

The cured products are distinguished by a high peel strength and high resistance to crack propagation. The curable compositions can be employed, for example, as structural adhesives.

18 Claims, No Drawings

PHENOL-TERMINATED POLYURETHANE OR POLYUREA(URETHANE) WITH EPOXY RESIN

This is a divisional of application Ser. No. 07/794,658, filed on Nov. 15, 1991, now abandoned, which is a continuation of application Ser. No. 07/527,685, filed May 18, 1990, now abandoned, which is a continuation of the parent application Ser. No. 07/233,298, filed Aug. 17, 1988, now abandoned.

The present invention relates to mixtures of specific diene copolymers and phenol-terminated polyurethanes or polyureas, to mixtures of this type containing epoxide resins and/or adducts of epoxide resins with the diene copolymer and/or the polyurethane or the polyurea, to the crosslinked products formed from these mixtures, to a process for curing the mixtures and to the use of the multi-component mixtures as adhesives, in particular as structural adhesives.

Mixtures of epoxide resins and phenol-capped polyurethanes are known from DE-A 2,152,606. The polyurethanes are obtained by reacting prepolymer diisocyanates with substituted or unsubstituted monophenols. The products no longer contain free, phenolic hydroxyl groups. They are combined with epoxide resins and polyamine curing agents to give curable coating agents which are distinguished by special elasticity. Water-soluble or partly water-soluble, phenol-terminated polyurethanes which are derived from water-soluble or partly water-soluble polyalkylene glycols, diisocyanates and bisphenols are known from U.S. Pat. No. 4,423,201. These compounds are reacted with epoxide resins and phenols to give water-dispersible epoxide resins. The modified epoxide resins can be employed as coating agents. Epoxide compositions which are stable on storage and which contain a polyisocyanate blocked by means of a monophenol or polyphenol are known from U.S. Pat. No. 3,442,974. No phenol-capped polyisocyanates which possess elastomeric properties are described. Hydroxyphenylurethanes which can be employed as antioxidants or as intermediates for the preparation of polycondensates or polyadducts are also known from EP-A 247,476.

It is also known that epoxide resins can be modified by adding copolymers based on butadiene and acrylonitrile or by adding adducts of such copolymers with epoxide resins.

In general, additives of this type effect an increase in the impact strength and the flexibility of the cured product. However, the peel strength generally leaves something to be desired. As a rule, the tensile shear strength and the glass transition temperature are reduced by the incorporation of such polymers.

Combinations of impact strength modifiers which, when mixed with epoxide resins, effect a significant increase in peel strength, have a reduced tendency to crack propagation and make possible high peel strength without loss of tensile shear strength have now been found.

Furthermore, these modifiers make it possible, depending on the resin formulation, to prepare elastic products having a high peel strength and a low glass transition temperature or high-strength products having a high glass transition temperature and a high peel resistance; the high-strength products are distinguished by high values of toughness to cracking, and the crack propagation is reduced markedly, even at very high impact load, similar to shock.

As a rule, the previously known products based on epoxide resins and butadiene copolymers do not contain a high proportion of the component imparting flexibility, since mixtures having a high content of flexibilizer can only be cured inadequately or not at all.

It has now been found that mixtures of epoxide resins and high proportions of butadiene copolymers in combination with specific phenol-terminated polyurethanes or polyureas can be cured, and highly flexible products can thus be prepared.

The present invention relates to compositions containing A) a copolymer based on at least one 1,3-diene and at least one polar, ethylenically unsaturated comonomer, and B) a phenol-terminated polyurethane, polyurea or polyurea-urethane of the formula I

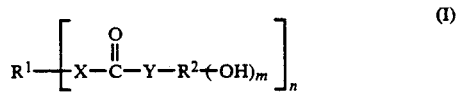

$$R^1 \left[ \begin{array}{c} O \\ \| \\ X-C-Y-R^2+OH)_m \end{array} \right]_n \quad (I)$$

in which m is 1 or 2, n is 2 to 6, $R^1$ is the n-valent radical of an elastomeric prepolymer, after the removal of the terminal isocyanate, amino or hydroxyl groups, which is soluble or dispersible in epoxide resins, X and Y independently of one another are —O— or —$NR^3$—, it being necessary for at least one of these groups to be —$NR^3$—, $R^2$ is an m+1-valent radical of a polyphenol or aminophenol after the removal of the phenolic hydroxy group(s) or the amino group or both the amino group and the phenolic hydroxyl group. respectively, and $R^3$ is hydrogen, $C_1$-$C_6$ alkyl or phenol.

Examples of 1,3-dienes for the preparation of component A) are butadiene, isoprene and chloroprene. Copolymers based on butadiene are preferred.

Examples of polar, ethylenically unsaturated comonomers for the preparation of component A) are acrylic acid, methacrylic acid, esters of acrylic or methacrylic acid, for example the methyl or ethyl esters, amides of acrylic or methacrylic acid, fumaric acid, itaconic acid, maleic acid or esters or half-esters thereof, for example the monomethyl or dimethyl esters, or maleic anhydride or itaconic anhydride; vinyl esters, for example vinyl acetate, polar styrenes, such as styrenes chlorinated or brominated in the nucleus, or, in particular, acrylonitrile or methacrylonitrile.

Besides polar, ethylenically unsaturated comonomers, component A) can also contain other non-polar, ethylenically unsaturated comonomers. Examples of these are ethylene, propylene or, in particular, styrene or substituted styrenes, such as vinyltoluene.

Component A) can be statistical copolymers, block copolymers or graft copolymers.

This component can be solid, in particular pulverulent, or, preferably, can be liquid. It can also be thermoplastics, thermoplastic elastomers or elastomers.

The proportion of the comonomers in component A) can vary within wide ranges. This component is so chosen that an elastomer phase is formed in combination with component B) and, if appropriate, an epoxide resin C). These can be homogeneous or heterogeneous systems.

An elastomer phase can already be present in component A), for example if a polybutadiene graft copolymer is used; the elastomer phase can, however, only be formed by selecting suitable components A), B) and, if appropriate, C).

If heterogeneous systems are desired, the components are, as a rule, selected in such a way that the difference between the solubility parameters of A) and/or B) and that of C) is between 0.2 and 1.0, preferably between 0.2 and 0.6. These selection criteria are described, for example, in C. B. Bucknall, "Toughened Plastics", Chapter 2, Applied Science Publishers Ltd., London 1977.

Preferred components A) are copolymers based on butadiene/acrylonitrile, butadiene/(meth)acrylic acid esters, butadiene/acrylonitrile/styrene graft copolymers (ABS), especially ABS powders, and butadiene/methyl methacrylate/styrene graft copolymers (MBS).

Components A) which are particularly preferred are copolymers which can be obtained by the graft copolymerization of polar, ethylenically unsaturated comonomers onto polybutadiene microgels.

Components A) which are very particularly preferred are liquid butadiene copolymers with polar, ethylenically unsaturated comonomers, in particular liquid butadiene/acrylonitrile copolymers.

The molecular weights of these preferred liquid butadiene copolymers are preferably 500–5,000, in particular 1,000–3,000.

Other components A) which are very particularly preferred are butadiene/acrylonitrile copolymers having functional groups which are reactive towards epoxide resins.

Examples of such copolymers are acrylonitrile/butadiene rubbers containing carboxyl or hydroxyl or amine groups, for example compounds of the type of Hycar ® made by Goodrich. Preferred types of such rubbers contain the structural elements of the following formulae IIa to IId and the end groups Q

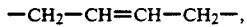  (IIa)

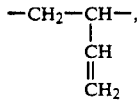  (IIb)

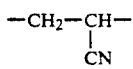  (IIc)

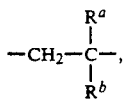  (IId)

in which $R^a$ is hydrogen or methyl, $R^b$ is —COOH, —COOR$^c$ or —CONH$_2$, $R^c$ is an aliphatic radical, preferably methyl, and Q is selected from the group consisting of —R—COOH, —R—OH and

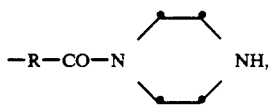

in which R is an alkylene radical; the proportion of the radicals IIa and IIb is preferably 5–50% by weight, the proportion of the radical Ic is preferably 5–50% by weight, and the proportion of the radical IId is preferably 0–30% by weight, in the case of radicals having free carboxyl groups preferably 0–10% by weight, the quantity data referring to the total amount of the radicals IIa, IIb, IIc and, if appropriate, IId.

Component A) can also be employed in the form of an adduct, onto an epoxide resin, of a butadiene/acrylonitrile copolymer having functional groups which are reactive towards epoxide resins.

The preparation of such adducts is effected in a manner known per se by heating the reactive acrylonitrile/butadiene rubber and the epoxide resin, if appropriate together with a catalyst, so that a fusible, but still curable, precondensate is formed.

The catalyst used is, for example, triphenylphosphine, tertiary amines, quaternary ammonium or phosphonium salts or chromium acetylacetonate.

The invention also relates to compositions containing A) an adduct, onto an epoxide resin, of an acrylonitrile/butadiene rubber having functional groups reactive towards epoxide resins, and B) a phenol-terminated polyurethane, polyurea or polyurea-urethane of the formula I, as defined above.

Component B) is a selected polyurethane or a selected polyurea derived from a specific prepolymer. The term "elastomeric prepolymer radical $R^1$" is to be understood, within the scope of this description, as meaning a radical, terminated with n-isocyanate, n-amino or n-hydroxyl groups, of a prepolymer which, after these groups have been capped, results in a phenol-terminated polyurethane, polyurea or polyurea-urethane of the formula I which, in combination with the diene component A) and epoxide resins C), produces, after curing, an elastomer phase or a mixture of elastomer phases. These can be homogeneous or heterogeneous combinations of components A), B) and C). The elastomer phase(s) is(are), as a rule, characterized by a glass transition temperature below 0° C. The term "prepolymer which is soluble or dispersible in epoxide resins" is to be understood, within the scope of this description, as meaning a radical, terminated by n-isocyanate, n-amino or n-hydroxyl groups, of a prepolymer which, after these groups have been capped, results in a phenol-terminated polyurethane, polyurea or polyurea-urethane of the formula I which is soluble, or is dispersible without further assistance, for example emulsifiers, in an epoxide resin C) or in a combination of an epoxide resin C) and a diene copolymer A); in the course of this, therefore, a homogeneous phase is formed or at least no macroscopic phase separation of one of the components A), B) or C) or of a mixture of the said components takes place.

In the case of heterogeneous systems, the difference described above in the solubility parameters of A) and/or B) and/or C) should, as a rule, be maintained.

The solubility or dispersibility of B) in the combination of A) and C) is effected primarily by the selection of suitable prepolymer radicals $R^1$. Examples of suitable radicals are given later in the text in the preparation of the component B).

The phenol-terminated polyurethane, polyurea or polyurea-urethane of the formula I is preferably a phenol-terminated polyurethane, polyurea or polyurea-urethane insoluble in water. This is to be understood, within the scope of this description, as meaning a phenol-terminated polyurethane, polyurea or polyurea-urethane which dissolves in water to the extent of less than 5% by weight, preferably less than 0.5% by weight, and which, when stored in water, absorbs only a small amount of water, preferably less than 5% by weight, in particular less than 0.5% by weight, or which, in the course thereof, exhibits only a slight swelling.

The prepolymers on which $R^1$ is based have, as a rule, molecular weights (number average) of 150 to 10,000, preferably 1,800 to 3,000.

The average functionality of these prepolymers is at least two, preferably 2 to 3 and particularly preferably 2 to 2.5.

The term "elastomeric polyurethane" of "elastomeric polyurea" is known per se to those skilled in the art (cf. C. Hepburn: "Polyurethane Elastomers", Applied Science Publishers, London 1982).

In general, elastomeric polyurethanes or polyureas contain rigid and flexible components (hard and soft segments).

The component B) can be liquid or thermoplastic, phenol-terminated polyurethanes, polyureas or polyurea-urethane of the formula I. Compounds having a softening point below 80° C., preferably below 40° C., are preferred.

Component B) can also be employed as an adduct of a phenol-terminated polyurethane or polyurea of the formula I onto an epoxide resin. Adducts of this type can be prepared in the manner described above.

For highly flexible systems, adducts of such polyurethanes or polyureas containing glycidyl ethers of aliphatic diols, such as 1,4-butanediol or 1,6-hexanediol, are preferred.

Suitable components B) can be essentially linear or are branched types. The degree of crosslinking is so selected that the polymer does not form a macroscopic gel. This will, as a rule, be the case if component B) is soluble or at least dispersible in a polar organic solvent or in an epoxide resin.

The phenol-terminated polyurethane, polyurea or polyurea-urethane of the formula I in which X is $-NR^3-$ and Y is $-NR^3-$ or, in particular, $-O-$, can be prepared by various routes depending on the nature of the prepolymer on which $R^1$ is based.

In the case of prepolymer isocyanates, they can be prepared by reacting compounds of the formula IIIa with polyphenols or aminophenols of the formula IVa (process a)

$R^1(\text{NCO})_n,$ (IIIa)

$H-Y-R^2(\text{OH})_m;$ (IVa)

polyureas of the formula I in which X is $-NR^3-$ and Y is $-NR^3-$ can also be prepared by reacting prepolymer amines of the formula IIIb with urethanes of the formula IVb (process b)

$R^1(\text{NR}^3H)_n,$ (IIIb)

$R^{11}-O-\overset{O}{\underset{\|}{C}}-NR^3-R^2(\text{OH})_m$ (IVb);

phenol-terminated polyurethane, polyurea or polyurea-urethane of the formula I in which X is $-NR^3-$ or $-O-$ and which have ortho-phenols or peri-phenols or ortho-aminophenols or peri-aminophenols as end groups, can also be prepared by reacting compounds of the formula IIIb with cyclic carbonates or urethanes of the formula IVc (process c)

$R^1(\text{NR}^3H)_n,$ (IIIb)

-continued

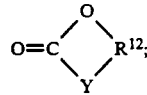

(IVc)

in these formulae IIIa, IIIb, IVa, IVb and IVc the radicals $R^1$, $R^2$, $R^3$ and Y and also the indices m and n are as defined earlier in the text, $R^{11}$ is a radical which acts as a detachable group, for example alkyl or aryl, especially $C_1$-$C_6$alkyl or phenyl, and $R^{12}$ is a divalent, carbo-cyclic-aromatic radical which has one of the meanings defined for $R^2$ and on which the groups $-O-$ and $-Y-$ are in each case located in the ortho-position or peri-position relative to one another.

The compounds of the formula I in which X is $-O-$ and Y is $-NR^3-$ can be obtained analogously to the processes described in EP-A 247,467.

This is effected, for example, by reacting an elastomeric and hydroxyl-terminated prepolymer of the formula V which is soluble or dispersible in epoxide resins with an amount, corresponding to the OH content of the prepolymer, of a carbamate of the formula IVb, as defined above, $R^1(\text{OH})_n,$ (V)

$R^{11}-O-\overset{O}{\underset{\|}{C}}-NR^3-R^2(\text{OH})_m;$ (IVb)

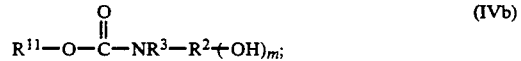

in these formulae the radicals $R^1$, $R^2$, $R^3$ and $R^{11}$ and also the indices m and n are as defined above.

In another embodiment the prepolymer of the formula V can first be reacted with an amount of phosgene corresponding to the OH content, and the resulting chlorocarbonyloxy derivative can then be reacted with a phenol or aminophenol of the formula IVa.

The radical $R^2$ is derived, in general, from phenols or aminophenols having a mononuclear or polynuclear, carbocyclic-aromatic radical.

Phenols radicals or aminophenol radicals having several carbocyclicaromatic radicals can be condensed or, preferably, attached via bridge members.

Examples of phenols or aminophenols having condensed radicals are dihydroxynaphthalenes or dihydroxyanthracenes or aminonaphthols.

Preferred radicals $R^2$ are derived from bisphenols of the formula VI

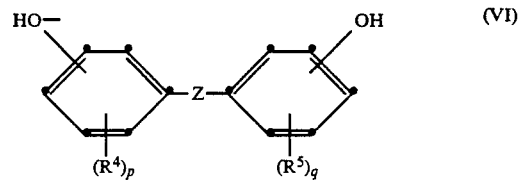

in which Z is a direct C—C bond or a bridge member selected from the group consisting of $-CR^6R^7-$, $-O-$, $-S-$, $-SO_2-$, $-CO-$, $-COO-$, $-CONR^8-$ and $-SiR^9R^{10}-$, $R^4$ and $R^5$ independently of one another are $C_1$-$C_{20}$alkyl, $C_2$-$C_6$alkenyl, $C_2$-$C_6$alkynyl or halogen, p and q independently of one another are 0, 1 or 2, $R^6$, $R^7$ and $R^8$ independently of one another are hydrogen, $-CF_3$ or $C_1$-$C_6$alkyl, or $R^6$ and $R^7$, together with the common C atom, form a cycloaliphatic radical having 5-12 ring C atoms, and $R^9$ and $R^{10}$ are $C_1$–$C_6$alkyl.

The radicals $R^2$ which are particularly preferred are derived from bis-phenols of the formula VI in which the hydroxyl groups are attached in the 4,4'-position, especially the derivatives in which p and q are 1 and $R^4$ and $R^5$ are allyl.

Other radicals $R^2$ which are particularly preferred are derived from bis-phenols of the formula VI in which Z is selected from the group consisting of —$CH_2$—, —$C(CF_3)_2$—, —O—, —$SO_2$—, a direct C—C bond and, especially, —$C(CH_3)_2$—, p and q are each 0 or 1 and $R^4$ and $R^5$ are $C_1$–$C_6$alkyl, $C_2$–$C_6$alkenyl, particularly allyl, or $C_2$–$C_6$alkinyl, particularly propargyl.

Other preferred radicals $R^2$ are derived from mononuclear aminophenols, for example 2-, 3- or 4-aminophenol, or from mononuclear polyphenols, for example resorcinol, hydroquinone or pyrogallol.

Radicals $R^2$ which are particularly preferred are derived from bisphenols; examples of these are 4,4'-dihydroxybiphenyl, bis-(4-hydroxyphenyl) ether, bis-(4-hydroxyphenyl) sulfone, bis-(4-hydroxyphenyl)-methane, 2,2-bis-(4-hydroxyphenyl)-propane and the corresponding 3,3'-dimethyl, 3,3'-dinonyl, 3,3'-diallyl, 3,3'-dichloro, 3,3'-dibomo and 3,3',5,5'-tetrabromo derivatives of these compounds.

If $R^4$ or $R^5$ are $C_1$–$C_{20}$alkyl, they are linear or branched radicals.

Examples of these are methyl, ethyl, n-propyl, isopropyl, n-butyl, isobutyl, tert.butyl, n-pentyl, n-hexyl, 2-ethylbutyl, n-heptyl, n-octyl, 2-ethylhexyl, n-nonyl, n-decyl, n-undecyl, n-dodecyl, n-tetradecyl, n-hexadecyl, n-octadecyl or n-eicosyl.

$R^4$ and $R^5$ are preferably $C_1$–$C_6$alkyl, particularly preferably linear $C_1$–$C_6$alkyl and very particularly preferably methyl.

If any radicals are $C_1$–$C_6$alkyl, they are preferably linear radicals, i.e. methyl, ethyl, n-propyl, n-butyl, n-pentyl or n-hexyl, but very particularly methyl.

Examples of $R^4$ and $R^5$ as $C_2$–$C_6$alkenyl are vinyl, allyl, 1-propenyl, 1-butenyl, 1-pentenyl or 1-hexenyl. Vinyl, 1-propenyl and allyl are preferred, allyl being very particularly preferred.

Examples of $R^4$ and $R^5$ as $C_2$–$C_6$alkinyl are ethinyl, propargyl, 1-butinyl, 1-pentinyl or 1-hexinyl. Propargyl is preferred.

If $R^4$ and $R^5$ are halogen, they can be fluorine, chlorine, bromine or iodine. Chlorine or bromine is preferred, particularly bromine.

Compounds of the formula VI having alkyl or alkenyl substituents are preferably used if the composition according to the invention is intended to have a high adhesion to oily steel.

Halogen-containing compounds of the formula VI generally increase the flame resistance.

If $R^6$ and $R^7$, together with the common C atom, form a cycloaliphatic radical, this is, for example, a cyclopentylidene, cyclohexylidene, cycloheptylidene, cyclooctylidene or cyclododecylidene radical. Cyclohexylidene and cyclododecylidene are preferred.

$R^3$ is preferably hydrogen.

The isocyanate of the formula IIIa is either a prepolymer a1) derived from the addition of a polyisocyanate, preferably a diisocyanate or triisocyanate and very particularly preferably a diisocyanate, onto a polyhydroxyl or polysulfhydryl prepolymer or onto a mixture of such prepolymer components, if appropriate in combination with chain lengtheners (short-chain polyhydroxyl, polysulfhydryl or polyamine compounds), or a polyisocyanate prepolymer a2) derived from a prepolymer polyamine of the formula IIIb, especially from a prepolymer polyetheramine.

Prepolymer components for the preparation of a1) can be condensation or addition polymers which can, if desired, contain grafted-on 1-olefins, it being possible for the said 1-olefins to contain not only non-polar groups, but also polar groups, such as nitrile, ester or amide groups. Examples of polymers are polyesters, polyethers, polythioethers, polyacetals, polyamides, polyester-amides, polyurethanes, polyureas, alkyd resins, polycarbonates or polysiloxanes, provided that these compounds are hydroxyl-terminated or sulfhydryl-terminated, result in compounds of the formula I which are soluble or dispersible in epoxide resins, and impart elastomeric properties according to the above definition to these resins.

Polyethers or segmented prepolymers containing polyether segments, such as polyether-amides, polyether-urethanes and polyether-ureas, are preferred.

These compounds are known to those skilled in the art in the field of polyurethane chemistry as components for the synthesis of polyurethanes. They can be linear or branched; linear types are preferred. Preferred synthesis components for prepolymers a1) are hydroxyl-terminated prepolymers having average molecular weights (number average) of 150–10,000, very particularly 500–3,000.

In addition to the hydroxyl-terminated or sulhydryl-terminated prepolymers, it is also possible for chain lengtheners to be present in the preparation of the prepolymer polyisocyanates a1).

Monomers of this type are preferably difunctional or trifunctional.

If trifunctional or polyfunctional hydroxyl-terminated or sulfhydryl-terminated prepolymers or trifunctional or polyfunctional chain lengtheners are used for the preparation of the component a1), the synthesis components should be selected in such a way that an adduct a1) which is soluble or at least swellable in organic solvents is formed.

When polyfunctional synthesis components are used, the degree of crosslinking can be regulated in a manner known per se by means of the nature and ratios of these components. It is also possible to vary the elastomer properties in a manner known per se by means of the degree of crosslinking.

Thus, if difunctional prepolymers or trifunctional or polyfunctional chain lengtheners are employed, as a rule only a small proportion of the polyfunctional component will be employed, whereas, if difunctional and trifunctional or polyfunctional prepolymers are combined, as a rule a larger amount of the polyfunctional chain lengthener can be present without excessive crosslinking taking place. The degree of crosslinking will also depend on the functionality of the polyisocyanate. Thus, if trifunctional or polyfunctional, hydroxyl-terminated or sulfhydryl-terminated synthesis components are present, diisocyanates will, as a rule, be employed, whereas, if difunctional, hydroxyl-terminated or sulfhydryl-terminated synthesis components are used, polyfunctional isocyanates will also be used. Examples of prepolymer synthesis components for the preparation of polyisocyanates a1) are hydroxyl-terminated polyethers, in particular polyethers which result in water-insoluble compounds of the formula I.

These include, for example, the polyalkylene etherpolyols which are obtained by anionic polymerization, copolymerization or block copolymerization of alkylene oxides, such as ethylene oxide, propylene oxide or butylene oxide, using difunctional or polyfunctional alcohols, such as 1,4-butanediol, 1,1,1-trimethylolethane, 1,1,1-trimethylolpropane, 1,2,6-hexanetriol, glycerol, pentaerythritol or sorbitol, or using amines, such as methylamine, ethylenediamine or 1,6-hexylenediamine, as initiator components, or by cationic polymerization or copolymerization of cyclic ethers, such as tetrahydrofuran, ethylene oxide or propylene oxide, using acid catalysts, such as $BF_3$.etherate, or by polycondensation of glycols which can be subjected to polycondensation with the elimination of water, such as 1,6-hexanediol, in the presence of acid etherification catalysts, such as p-toluenesulfonic acid. It is also possible to use oxalkylation products of phosphoric acid or phosphorous with ethylene oxide, propylene oxide, butylene oxide or styrene oxide.

Other preferred hydroxyl-terminated polyethers contain grafted-on 1-olefins, such as acrylonitrile, styrene or acrylic acid esters. In this case the proportion by weight of the graft component is, as a rule, 10–50%, particularly 10–30%, relative to the amount of polyether employed.

Other examples of prepolymer synthesis components for the preparation of polyisocyanates a1) are hydroxyl-terminated polyester-polyols derived from dicarboxylic and/or polycarboxylic acids and diols and/or polyols, preferably from dicarboxylic acids and diols.

Examples of such polycondensates are the hydroxyl-terminated polyesters which can be obtained by polycondensation of adipic acid, sebacic acid, azelaic acid, dimeric and trimeric fatty acids, phthalic acid, isophthalic acid, terephthalic acid, tetrahydrophthalic acid, hexahydrophthalic acid and endomethylenetetrahydrophthalic acid with propylene glycol, 1,4-butanediol, 1,6-hexanediol, diethylene, triethylene and tetraethylene glycol, dipropylene, tripropylene and tetrapropylene glycol, dibutylene, tributylene and tetrabutylene glycol, 2,2-dimethylpropane-1,3-diol, 1,1,1-trimethylolpropane, 1,1,1-trimethylolethane and 1,2,6-hexanetriol.

Other suitable prepolymer synthesis components for the preparation of polyisocyanates a1) are hydroxyl-terminated polybutadienes, which are reacted, in particular, with hydroxyl-terminated polyethers in order to form the component a1)

Other examples of suitable prepolymer synthesis components for the preparation of polyisocyanates a1) are polymerization products of lactones, for example ε-caprolactones; or polyalkylene thioether-polyols, for example the polycondensation products of thiodiglycol with itself and with diols and/or polyols, for example 1,6-hexanediol, triethylene glycol, 2,2-dimethyl-1,3-propanediol or 1,1,1-trimethylolpropane.

The preferred prepolymer synthesis components for the preparation of polyisocyanates a1) are hydroxyl-terminated polyethers or polyesters.

Other preferred prepolymer synthesis components for the preparation of polyisocyanates a1) are mixtures of hydroxyl-terminated polybutadiene and hydroxyl-terminated polyalkylene glycol or hydroxyl-terminated polyalkylene glycols containing grafted-on 1-olefins, in particular styrene or acrylic acid derivatives, such as acrylic acid esters or acrylonitrile.

Prepolymer synthesis components for the preparation of polyisocyanates a1) which are very particularly preferred are hydroxyl-terminated polyethers, in particular dihydroxyl-terminated polyalkylene glycols.

Chain lengtheners for the preparation of the prepolymer polyisocyanate a1) are known per se. Examples of these are the diols and polyols mentioned earlier in the text for the preparation of the hydroxyl-terminated polyethers, in particular the diols and triols, such as 1,4-butanediol, 1,1,1-trimethylolpropane or hydroquinone 2-hydroxyethyl ether, or diamines, such as diaminoethane, 1,6-diaminohexane, piperazine, 2,5-dimethylpiperazine, 1-amino-3-aminomethyl-3,5,5-trimethylcyclohexane, 4,4'-diaminocyclohexylmethane, 1,4-diaminocyclohexane and 1,2-propylenediamine, or hydrazine, aminoacid hydrazides, hydrazides of semicarbazidocarboxylic acids, bis-hydrazides and bis-semicarbazides.

Short-chain diols or triols are preferably used as chain lengthening agents.

The prepolymer polyisocyanate a2) can be obtained in a manner known per se from amino-terminated prepolymers of the formula IIIb, especially from amino-terminated polyethers, by reaction with phosgene or with polyisocyanates, preferably diisocyanates or triisocyanates and particular preferably diisocyanates. In general, besides the amino groups, the amino-terminated prepolymers do not contain any further radicals having active hydrogen atoms. Prepolymers having terminal amino groups are derived, in general, from the hydroxyl-terminated condensation or addition polymers described earlier in the text as synthesis components for a1), particularly from polyethers.

They can be obtained by reacting the said condensation or addition polymers containing secondary hydroxyl groups with ammonia or by reacting the said condensation or addition polymers containing primary hydroxyl groups, for example polybutylene glycol, with acrylonitrile, and subsequently hydrogenating these products.

Prepolymer-amino-terminated poly-THF can also be obtained by the method of S. Smith et al. in Macromol. Sci. Chem., A7(7), 1399–1413 (1973) by terminating a difunctional, still active, cationic THF polymer with potassium cyanate.

The polyisocyanates used for the preparation of the components a1) or a2) are, as a rule, aliphatic, cycloaliphatic, aromatic or araliphatic diisocyanates, triisocyanates or tetraisocyanates or precursors which can be converted into isocyanates of this type.

The aliphatic, cycloaliphatic or araliphatic diisocyanates or triisocyanates are preferred, very particularly the aliphatic or cycloaliphatic diisocyanates.

The preferred aliphatic diisocyanates are, as a rule, linear or branched α,ω-diisocyanates. The alkylene chains can, if appropriate, be interrupted by oxygen or sulfur atoms and can, if appropriate, contain ethylenically unsaturated bonds.

α,ω-Diisocyanates having linear, saturated $C_2-C_{20}$ alkylene radicals are preferred.

Examples of such radicals are ethylene, trimethylene, tetramethylene, pentamethylene, hexamethylene, heptamethylene, octamethylene, decamethylene, dodecamethylene, tetradecamethylene, hexadecamethylene, octadecamethylene and eicosamethylene.

Examples of preferred aliphatic α,ω-diisocyanate radicals which are interrupted by hetero atoms are —$(CH_2—CH_2—O)_o—CH_2—CH_2$—, —(CH(CH- $_3$)—CH$_2$—O)$_o$—CH(CH$_3$)—CH$_2$—, —(CH$_2$—CH$_2$—CH$_2$—CH$_2$—O)$_o$—CH$_2$—CH$_2$—CH$_2$ CH$_2$ and —(CH$_2$—CH$_2$—S)$_o$—CH$_2$—CH$_2$— in which o is 1 to 20.

The preferred cycloaliphatic diisocyanates are, as a rule, derivatives which are derived from substituted or unsubstituted cyclopentanes, cyclohexanes or cycloheptanes. It is also possible for two such rings to be attached to one another via a bridge member.

Example of radicals of this type are 1,3-cyclohexylene, 1,4-cyclohexylene or dodecahydrodiphenylmethane-4,4'-diyl.

It is also possible to use diisocyanates or triisocyanates derived from dimeric or trimeric fatty acids. These compounds can be obtained in a manner known per se from the fatty acids by rearrangement to give the corresponding diisocyanates or triisocyanates (Hoffmann, Curtius or Lossen rearrangements).

Examples of preferred aromatic diisocyanates correspond to the examples of divalent phenol radicals given earlier in the text, in which the —OH groups have been replaced by —NCO groups.

Examples of araliphatic diisocyanate radicals are 1,2-xylylene and 1,4-xylylene.

Specific examples of suitable polyisocyanates are 2,4-diisocyanatotoluene and technical mixtures thereof with 2,6-diisocyanatotoluene, 2,6-diisocyanatotoluene, 1,5-diisocyanatonaphthalene, 4,4'-diisocyanatodiphenylmethane and technical mixtures of various diisocyanatodiphenylmethanes (for example the 4,4'- and 2,4'-isomers), urethanized 4,4'-diisocyanatodiphenylmethane, carbodiimidized 4,4'-diisocyanatodiphenylmethane, the uretdione of 2,4-diisocyanatotoluene, triisocyanatotriphenylmethane, the adduct formed from diisocyanatotoluene and trimethylolpropane, the trimer formed from diisocyanatotoluene, diisocyanato-m-xylylene, N,N'-di-(4-methyl-3-isocyanatophenyl)-urea, mixed trimerization products of diisocyanatotoluene and 1,6-diisocyanatohexamethylene, 1,6-diisocyanatohexane, 3,5,5-trimethyl-1-isocyano-3-isocyanatomethylcyclohexane (isophorene diisocyanate), N,N',N'''-tri-(6-isocyanatohexyl)-biuret, 2,2,4-trimethyl-1,6-diisocyanatohexane, 1-methyl-2,4-diisocyanatocyclohexane, dimeryl, diisocyanate, 4,4'-diisocyanatodicyclohexylmethane, trimeric isophorene, diisocyanate, trimeric hexane diisocyanate and methyl 2,6-diisocyanatohexanoate.

The preparation of the component a1) or a2) is effected in a manner known per se by reacting the hydroxyl-terminated, sulfhydryl-terminated or amino-terminated elastomeric prepolymer component with a polyisocyanate or with a mixture of these components. The reactions can, if appropriate, be carried out in the presence of a chain lengthener.

The preparation of the component a1) or a2) is carried out without a solvent or in solvents which are inert towards isocyanates.

Examples of inert solvents are esters, such as ethyl acetate, butyl acetate, methylglycol acetate and ethylglycol acetate; ketones, such as methyl ethyl ketone or methyl isobutyl ketone; aromatic compounds, such as toluene or xylene, or halogenated hydrocarbons, such as trichloroethane or methylene dichloride.

If a certain additional chain lengthening reaction via urethanes or urea groups is accepted, or is even desired, the prepolymers containing hydroxyl, sulfhydryl or amino groups and the monomers which may be present are reacted with the diisocyanate or polyisocyanate in an NCO/OH or NCO/SH or NCO/NH$_2$ ratio, respectively, of 1.5-2.5:1, preferably 1.8-2.5:1, if appropriate first at 0°-25° C. and with cooling, and subsequently, if appropriate, for several hours by heating at, preferably 50°-120° C.

If a chain lengthening reaction is not desired, a substantially larger excess of diisocyanate or polyisocyanate, for example an NCO/OH, NCO/SH or NCO/NH$_2$, respectively, ratio of 3-5, and no chain lengthener, is, as a rule, used, and the procedure is otherwise as described for low NCO/OH, NCO/SH or NCO/NH$_2$ ratios. After the reaction the excess diisocyanate or polyisocyanate is, if appropriate, removed, for example by thin film distillation or by solvent extraction.

The reaction of the hydroxyl-terminated, sulfhydryl-terminated or aminoterminated prepolymers with polyisocyanates is carried out in the presence of catalysts known per se.

Examples of these are diazabicyclooctane, dibutyltin dilaurate or tin-II octoate. These catalysts are employed in the customary amounts, for example in amounts of 0.001-2% by weight, relative to the amount of polyisocyanate.

The reaction of the components a1) or a2) (polyisocyanate IIIa) with the phenol or aminophenol IVa is carried out analogously to the reaction, described above, of the hydroxyl-terminated, sulfhydryl-terminated or amino-terminated synthesis component with the polyisocyanate.

The polyphenol or aminophenol IVa is preferably initially taken in this reaction in an amount such that the free NCO groups are essentially consumed by the reaction and that, in the main, one —OH or —NH$_2$ group reacts per polyphenol or aminophenol.

This will, as a rule, be the case if about two or three moles of OH groups of the bisphenol or trisphenol or about one mole of NH$_2$ groups of the aminophenol are initially taken for 1 mole of free isocyanate groups.

In the case of the polyphenols IVa the OH:NCO ratio is generally 1.5:1.0 to 3.0:1.0, preferably 1.8:1.0 to 2.5:1.0.

In the case of the aminophenols IVa the NH$_2$:NCO ratio is generally 0.8:1.0 to 1.2:1.0, preferably 0.8:1.0 to 1.0:1.0.

It is, of course, also possible to employ excess amounts of the component IVa, in which case chain lengthening can take place via the phenol; however, the end product should not contain more than 50% by weight, preferably less than 10% by weight, of unreacted component IVa, relative to the total mixture.

In the case of the aminophenols IVa, a stoichiometric amount is generally desirable.

It is also possible to employ mixtures of phenol and/or aminophenol IVa for masking the polyisocyanate IIIa. These mixtures can also contain small proportions of monophenols. In this variant, the proportion of monophenol is so chosen that the reaction product consists mainly of compounds of the formula I having free phenolic OH groups.

The amino-terminated prepolymers IIIb in process b) or c) are, as a rule, the prepolymer polyamines which have already been described in process a) and which were employed in that process for the preparation of the prepolymer polyisocyanate components IIIa. Preferred compounds IIIb are amino-terminated polyethers as defined above.

The urethanes IVb are derived from aminophenols $HR^3N-R^2-(OH)_m$ in which $R^2$, $R^3$ and m are as defined above. Urethanes IVb are prepared by masking these aminophenols with $R^{11}-O-CO-Cl$ in a manner known per se. In this formula $R^{11}$ is as defined earlier in the test. The reaction of the components IIIb and IVb (process b) is generally carried out by initially taking the two components in a stoichiometric ratio or a slight excess of component IVb and by heating the mixture so that virtually all the free amino groups of IIIb are masked.

The reaction is preferably carried out in an inert solvent. Examples of these have been listed earlier in the text.

The cyclic carbonates or urethanes IVc are derived from ortho- or peribisphenols or ortho- or peri-aminophenols of formula $HO-R^{12}-OH$ or $HR^3N-R^{12}-OH$, respectively. In these formulae $R^3$ and $R^{12}$ are as defined earlier in the text. The compounds IVc can be obtained therefrom by reaction with phosgene. The reaction of the components IIIb and IVc (process c) is generally carried out by initially taking the two components in a stoichiometric ratio or a slight excess of component IVc. In other respects the reaction is carried out as described in process a).

The molecular weight (number average) of the phenol-terminated polyurethane, polyurea or polyurea-urethane B) is usually within the range from 500 to 50,000, preferably within the range from 500 to 10,000 and very particularly preferably within the range from 500 to 3,000.

The viscosity of these phenol-terminated polyurethane, polyurea or polyurea-urethane is, as a rule, less than 150,000 mPa s, preferably less than 100,000 mPa s (measured at 80° C. by means of the Epprecht viscometer).

The structures of the phenol-terminated polyurethanes, polyureas or polyurea-urethanes of the formula I which are derived from the reaction according to process a), b) or c) differ, depending on the functionality of the prepolymer radical $R^1$.

In process a) this functionality is determined, for example, by the functionality of the hydroxyl-terminated, sulfhydryl-terminated or aminoterminated prepolymers, by the chain lengtheners which may be employed, by the functionality of the isocyanate used for the preparation of IIIa and by the ratios between the individual reactants. Preferred components B) are phenol-terminated polyurethane, polyurea or polyurea-urethane of the formula I in which X is —NH— and Y is —NH—, but very particularly preferably —O—.

Components B) which are also preferred are phenol-terminated polyurethane, polyurea or polyurea-urethane of the formula I which are essentially free from isocyanate groups and contain at least two free phenolic hydroxyl groups and can be obtained by reacting a) a prepolymer polyisocyanate which a1) is an adduct of a polyisocyanate onto a prepolymer polyhydroxy or polysulfhydryl compound or onto a mixture of such compounds, if appropriate in combination with a chain lengthener, or a2) is derived from a prepolymer polyether-amine, with b) at least one phenol having two or three phenolic hydroxyl groups or an aminophenol having one or two phenolic hydroxyl groups.

Phenol-terminated polyurethane, polyurea or polyurea-urethane of the formula I which are particularly preferred are derived from prepolymer polyisocyanates a) which have an average isocyanate functionality of 2 to 3.

Phenol-terminated polyurethane, polyurea or polyurea-urethane of the formula I which are particularly preferred are those in which component a1) is an adduct of a polyisocyanate onto a hydroxylterminated prepolymer having an average molecular weight of 150 to 10,000. Compounds of the formula I which are very particularly preferred are those in which the synthesis component for the preparation of component a1) is a hydroxyl-terminated polyether or polyester.

This synthesis component for the preparation of component a1) is preferably employed in combination with chain lengtheners.

Phenol-terminated polyurethanes of the formula I which are very particularly preferred are those in which the polyisocyanate for the preparation of component a1) is an aliphatic, cycloaliphatic, aromatic or araliphatic diisocyanate or triisocyanate.

In a preferred embodiment, the preparation of the component a1) is carried out using a hydroxyl-terminated polyether or polyester, in the absence of a chain lengthener and using a polyisocyanate in excess relative to the OH content; this gives, after masking with the polyphenol or aminophenol, polyurethanes of the formula VII

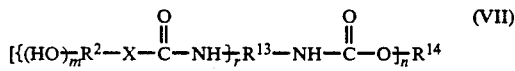

in which $R^2$, m and n are as defined above, r is an integer between 1 and 3, X is —O— or —NH—, $R^{13}$ is the r+1-valent radical of an aliphatic, cycloaliphatic, aromatic or araliphatic polyisocyanate after the removal of the isocyanate groups, and $R^{14}$ is an n-valent, hydroxy-terminated polyester or polyether radical after the removal of the terminal OH groups, subject to the proviso that the index m and the radicals $R^2$ and $R^{13}$ can be different within a given molecule.

Compositions containing phenol-terminated polyurethanes of the formula VII as component B) are preferred.

The index m is preferably 1. The index n is preferably 2 or 3, very particularly preferably 2. The index r is preferably 1. Preferred components B) are phenol-terminated polyurethanes of the formula VII in which m is 1, n is 2 or 3, r is 1, X is —O—, $R^{13}$ is derived from an aliphatic, cycloaliphatic or aromatic diisocyanate and $R^{14}$ is a divalent or trivalent radical of a hydroxyl-terminated polyester or polyether having a molecular weight of 150 to 10,000 after the removal of the terminal hydroxyl groups.

Components B) which are very particularly preferred are phenol-terminated polyurethanes of the formula VII in which m is 1, n is 2 or 3, r is 1, X is —O—, $R^{13}$ is derived from an aliphatic or cycloaliphatic diisocyanate and $R^{14}$ is a divalent or trivalent radical of a polyalkylene ether-polyol having a molecular weight of 150 to 3,000 after the removal of the terminal hydroxyl groups.

The particularly preferred components B) of this last-defined type include those in which n is 2 and $R^{14}$ is a structural element of the formula VIII

in which s is 3 or 4, x is an integer from 5 to 40 and the units $-C_sH_{2s}-O-$ can be different within a given structural element of the formula VIII, within the scope of the definitions given.

The following are examples of structural elements of the formula VIII: and copolymers containing these structural elements.

The components B) of this invention which are also preferred include compounds which can be obtained by reacting a1) an adduct of an essentially equivalent amount of a diisocyanate with a mixture of a dihydroxyl-terminated or trihydroxyl-terminated polyether or polyester and less than 1 mol %, relative to the hydroxyl-terminated prepolymer, of a shortchain diol or triol and b) an amount of a bisphenol or trisphenol which is essentially equivalent to the NCO content.

In another preferred embodiment, the preparation of the component a2) is carried out using an amino-terminated polyalkylene ether, reacting the latter in the absence of a chain lengthener within an excess of diisocyanate, relative to the $NH_2$ content, or with phosgene, and masking the resulting polyisocyanate with a polyphenol or aminophenol IIIa. This gives a phenol-terminated polyurea-urethanes of the formula IX

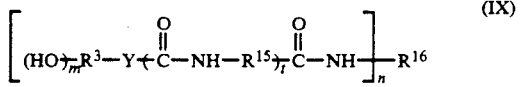

in which $R^3$, Y, m and n are as defined above, t is 0 or 1, $R^{15}$ is the divalent radical of an aliphatic, cycloaliphatic, aromatic or araliphatic diisocyanate after the removal of the isocyanate groups, and $R^{16}$ is the n-valent radical of an amino-terminated polyalkylene ether after the removal of the terminal $NH_2$ groups.

Compositions containing phenol-terminated polyurea-urethanes of the formula IX as the component B) are preferred.

Particularly preferred compositions contain, as the component B), phenol-terminated polyurea-urethanes of the formula IX in which m is 1, n is 2 or 3, Y is —O—, $R^{15}$ is derived from an aliphatic, cycloaliphatic or aromatic diisocyanate and $R^{16}$ is a divalent or trivalent radical of an amino-terminated polyalkylene ether having a molecular weight of 150 to 10,000 after the removal of the terminal amino groups.

Compositions which are very particularly preferred contain, as the component B), phenol-terminated polyurea-urethanes of the formula IX in which m is 1, n is 2, t is 0, Y is —O— and $R^{16}$ is derived from a divalent, amino-terminated polyalkylene ether having a molecular weight of 150 to 6,000.

Compositions which are very particularly preferred contain, as the component B), phenol-terminated polyurea-urethanes of the formula IX in which m and t are 1, n is 2, $R^{15}$ is the divalent radical of an aliphatic or cycloaliphatic diisocyanate after the removal of the isocyanate groups, and $R^{16}$ is derived from a divalent, amino-terminated polyalkylene ether having a molecular weight of 150 to 6,000.

The particularly preferred components B) of these last-defined types include those in which $R^{16}$ is a structural element of the formulae X, XI, XII, XIII or XIV

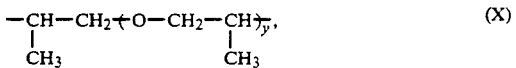

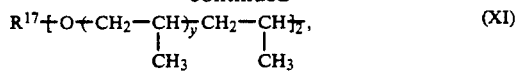

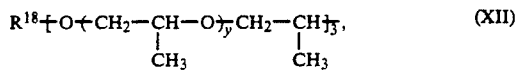

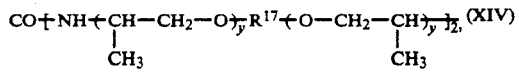

in which y is 5 to 90, preferably 10 to 70, z is 10 to 40, $R^{17}$ is a radical of an aliphatic diol after the removal of the two OH groups, and $R^{18}$ is a radical of an aliphatic triol after the removal of the three OH groups.

The compositions, according to the invention, formed from A) and B) can be processed with epoxide resins to give cured products having the advantageous properties described earlier in the text.

The invention therefore also relates to compositions containing components A) and B) as defined above and C), an epoxide resin having at least two 1,2-epoxide groups per molecule; or containing an adduct formed from component A) and an epoxide resin, and also component B) and, if appropriate, component C); or containing component A), an adduct formed from component B) and an epoxide resin and, if appropriate, component C); or containing an adduct formed from component A) and an epoxide resin, an adduct formed from component B) and an epoxide resin, and, if appropriate, component C).

The preparation of the compositions according to the invention can be effected in a customary manner by mixing the components by means of known mixing units (stirrers and rolls).

In principle, any compound which is customary in the technology of epoxide resins can be employed as the component C) or for the preparation of the adducts.

The following are examples of epoxide resins:

I) polyglycidyl and poly-($\beta$-methylglycidyl)esters which can be obtained by reacting a compound having at least two carboxyl groups in the molecule and epichlorohydrin or $\beta$-methylepichlorohydrin. The reaction is advantageously carried out in the presence of bases.

Aliphatic polycarboxylic acids can be used as the compound having at least two carboxyl groups in its molecule. Examples of these polycarboxylic acids are oxalic acid, succinic acid, glutaric acid, adipic acid, pimelic acid, suberic acid, azelaic acid and dimerized or trimerized linoleic acid.

It is also possible, however, to employ cycloaliphatic polycarboxylic acids, for example tetrahydrophthalic acid, 4-methyltetrahydrophthalic acid, hexahydrophthalic acid or 4-methylhexahydrophthalic acid.

It is also possible to use aromatic polycarboxylic acids, for example phthalic acid, isophthalic acid or terephthalic acid.

II) Polyglycidyl or poly-($\beta$-methylglycidyl) ethers which can be obtained by reacting a compound having at least two free alcoholic hydroxyl groups and/or phenolic hydroxyl groups and a suitably substituted epichlorohydrin under alkaline conditions, or in the presence of an acid catalyst, with subsequent treatment with alkali.

Ethers of this type are derived, for example, from acyclic alcohols, such as ethylene glycol, diethylene glycol and higher poly-(oxyethylene) glycols, propane-1,2-diol or poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylolpropane, pentaerythritol, sorbitol and polyepichlorohydrins.

They are, however, also derived, for example, from cycloaliphatic alcohols, such as 1,4-cyclohexanedimethanol, bis-(4-hydroxycyclohexyl)-methane or 2,2-bis-(4-hydroxy-cyclohexyl)-propane, or they possess aromatic nuclei, such as N,N-bis-(2-hydroxyethyl)-aniline or p,p'-bis-(2-hydroxyethylamino)-diphenylmethane.

The epoxide compounds can also be derived from mono-nuclear phenols, for example resorcinol or hydroquinone; or they are based on polynuclear phenols, for example bis-(4-hydroxyphenyl)-methane, 4,4'-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane, 2,2-bis-(3,5-di-bromo4-hydroxyphenyl)-propane and novolaks which can be obtained by subjecting aldehydes, such as formaldehyde, acetaldehyde, chloral or furfuraldehyde, to a condensation reaction with phenols, such as phenol, or with phenols which are substituted in the nucleus by chlorine atoms or $C_1$–$C_9$alkyl groups, for example 4-chlorophenol, 2-methylphenol or 4-tert.-butylphenol, or by a condensation reaction with bis-phenols, as described above.

III) Poly-(N-glycidyl) compounds which can be obtained by dehydrochlorinating the reaction products of epichlorohydrin with amines which contain at least two amino hydrogen atoms. These amines are, for example, aniline, n-butylamine, bis-(4-aminophenyl)-methane, m-xylenediamine or bis-(4-methyl-aminophenyl)-methane.

The poly-(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as 5,5-dimethylhydantoin.

IV) Poly-(S-glycidyl) compounds, for example di-S-glycidyl derivatives derived from dithiols, for example ethane-1,2-dithiol or bis-(4-mercaptomethylphenyl) ether.

V) Cycloaliphatic epoxide resins, for example bis-(2,3-epoxy cyclopentyl) ether, 2,3-epoxycyclopentyl glycidyl ether, 1,2-bis-(2,3-epoxycyclopentyloxy)-ethane or 3,4-epoxycyclohexylmethyl 3',4'-epoxycyclohexanecarboxylate.

It is also possible, however, to use epoxide resins in which the 1,2-epoxy groups are attached to various heteroatoms or functional groups; these compounds include, for example, the N,N,O-triglycidyl derivative of 4-aminophenol, the glycidyl ether/glycidyl ester of salicyclic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

A diglycidyl ether of bisphenol, for example 2,2-bis-(4-hydroxyphenyl)-propane, a polyglycidyl ether of a novolak formed by reacting formaldehyde with a phenol, a diglycidyl ether of an aliphatic diol, especially butane-1,4-diol, or an adduct of a diglycidyl ether of an aliphatic diol with bisphenol A are particularly preferred as epoxide resins.

The curable compositions according to the invention also contain, as a rule, additional curing agents D) which are known to those skilled in the art, if appropriate in combination with an accelerator E).

Examples of curing agents are D) aliphatic, cycloaliphatic, aromatic and heterocyclic amines, such as bis-(4-aminophenyl)-methane, aniline/formaldehyde resins, bis-(4-aminophenyl) sulfone, propane-1,3-diamine, hexamethylenediamine, diethylenetriamine, triethylenetetramine, 2,2,4-trimethylhexane-1,6-diamine, m-xylylenediamine, bis-(4-aminocyclohexyl)methane, 2,2-bis-(4-aminocyclohexyl)-propane and 3-aminomethyl-3,5,5-trimethylcyclohexylamine (isophoronediamine); polyaminoamides, for example those formed from aliphatic polyamines and dimerized or trimerized fatty acids; polyphenols, such as resorcinol, hydroquinone, 2,2-bis-(4-hydroxyphenyl)-propane (bisphenol A) and phenol/aldehyde resins; polythiols, such as the polythiols obtainable commercially under the name "Thiokole ®"; polycarboxylic acids and anhydrides thereof, for example phthalic anhydride, tetrahydrophthalic anhydride, hexahydrophthalic anhydride, hexachloroendomethylenetetrahydrophthalic anhydride, pyromellitic dianhydride, benzophenone-3,3',4,4'-tetracarboxylic dianhydride, the acids of the abovementioned anhydrides and also isophthalic acid and terephthalic acid. It is also possible to use curing agents having a catalytic action, for example tertiary amines [for example 2,4,6-tris-(dimethylaminoethyl)-phenol]; imidazoles or Mannich bases; alkali metal alcoholates (for example the Na alcoholate of 2,4-dihydroxy-3-hydroxymethylpentane); tin salts of alkanoic acids (for example tin octanoate); Friedel-Crafts catalysts, such as boron trifluoride and boron trichloride and complexes and chelates thereof which are obtained by reacting boron trifluoride with, for example, 1,3-diketones; and amidines, preferably dicyandiamide.

Examples of accelerators E) are tertiary amines and salts or quaternary ammonium compounds thereof, such as benzyldimethylamine, 2,4,6-tris-(dimethylaminomethyl)-phenol, 1-methylimidazole, 2-ethyl-4-methylimidazole, 4-aminopyridine, tripentylammonium phenolate or tetramethylammonium chloride; or alkali metal alcoholates, such as Na alcoholates of 2,4-dihydroxy-3-hydroxymethylpentane; or substituted ureas, such as N-(4-chlorophenyl)-N',N'-dimethylurea or N-(3-chloro-4-methylphenyl)-N',N'-dimethylurea (chlortoluron).

The properties of the cured end product can be varied, in accordance with the proportion of the components A) and B).

The following percentages relate in each case to the total weight of the components A), B) and C).

If products having a high strength, high glass transition temperature, high peeling resistance, high impact strength and high resistance to crack propagation (toughness to cracking) are desired, the proportion of the components A) and B) should, as a rule, not exceed 60% by weight. Systems of this type are heterogeneous, as a rule. The lower limit depends on the properties desired, for example the peeling resistance. As a rule, components A) and B) should amount to more than 5% by weight, preferably more than 10% by weight.

If, on the other hand, products having the highest possible flexibility are desired, at least 40% by weight, preferably more than 60% by weight, of the components A) and B) should be present.

If component A) and/or B) has been modified by the formation of an adduct with an epoxide resin, a separate component C) is not absolutely necessary.

In the case of highly flexible systems, it is preferable to modify component A) by the formation of an adduct with epoxide resins; adducts of liquid acrylonitrile-/butadiene copolymers having groups which are reactive towards epoxide resins, with glycidyl ethers of aliphatic diols, such as 1,4-butanediol or 1,6-hexanediol, are particularly preferred.

Glycidylized novolaks derived from phenols having long-chain aliphatic substituents in the nucleus, such as nonylphenol or cashew nut oil, are particularly suitable as the component C) in this case.

The ratio by weight of A) to B) can be varied within wide limits. The preferred range of A) to B) is 50:1 to 1:50, 20:1 to 1:10 is particularly preferred and 5:1 to 1:5 is very particularly preferred.

The proportion of the epoxide resin C) to the total amount of A), B) and C) can also be varied within wide limits. For cured products having an increased flexibility, fairly small amounts of C), for example 10 to 30% by weight, will, in general, be employed, it being also possible for component C) to be in the form of an adduct with A), whereas for cured products having a high strength, fairly large amounts of C), for example 50 to 95% by weight, preferably 60–80% by weight, will, in general, be employed.

Surprisingly, it is possible to cure a composition containing a high proportion of components A) and B), for example more than 50% by weight, relative to the amounts of A), B) and C).

The invention therefore also relates to a process for curing compositions containing components A), B) and C), as defined above, by adding a curing agent D) which is active at room temperature or at an elevated temperature, and, if appropriate, a curing accelerator E) for C) and, if appropriate, by heating, wherein the proportion of A) amounts to more than 50% by weight, relative to the weight of A), B) and C).

The amount of curing agent D) or accelerator E) depends on the type of curing agent and is selected by those skilled in the art in a manner known per se.

Preferred are heat curable systems comprising components A), B) and C) in combination with primary and/or secondary aromatic amines or with amidines as curing agent D).

The preferred curing agent is dicyandiamide. In this case, it is preferable to employ 0.1–0.5 mole of the curing agent per mole of epoxide groups.

The curing of the compositions according to the invention can be carried out at room temperature or at higher temperatures.

In general, the curing temperatures in the case of hot curing are between 80° and 250° C., preferably between 100° and 180° C. The curing can, if desired, also be carried out in two stages, for example by interrupting the curing process or, if a curing agent is employed for fairly high temperatures, by allowing the curable mixture to cure partially at lower temperatures. The products obtained thereby are precondensates which are still fusible and soluble (so-called "B-stage resins") and are suitable, for example, for compression moulding materials, sintered powders or prepregs.

If desired, reactive thinners, for example styrene oxide, butyl glycidyl ether, 2,2,4-trimethylpentyl glycidyl ether, phenyl glycidyl ether, cresyl glycidyl ether or glycidyl esters of synthetic, highly branched, mainly tertiary, aliphatic monocarboxylic acids, can be added to the curable mixtures to reduce their viscosity further.

Other customary additives which the mixtures according to the invention can contain are plasticizers, extenders, fillers and reinforcing agents, for example coal tar, bitumen, textile fibres, glass fibres, asbestos fibres, boron fibres, carbon fibres, mineral silicates, mica, powdered quartz, hydrated aluminum oxide, bentonite, wollastonite, kaolin, silica aerogel or metal powders, for example aluminium powder or iron powder, and also pigments and dyes, such as carbon black, oxide colours and titanium dioxide, fire-retarding agents, thixotropic agents, flow control agents, such as silicones, waxes and stearates, which can, in part, also be used as mould release agents, adhesion promoters, antioxidants and light stabilizers.

The cured products are distinguished by the advantageous properties described initially.

The invention therefore also relates to the products which can be obtained by curing compositions containing A), B) and C); in this regard it is also possible to employ components A) and/or B) as adducts to epoxide resins.

The mixtures according to the invention can be used, for example, as adhesives, adhesive films, patches, matrix resins, lacquers or sealing compositions or very generally for the preparation of cured products. They can be used in a formulation adapted to suit the particular field of use in each case, in an unfilled or filled state, for example as paints, coating compositions, lacquers, compression moulding materials, dipping resins, casting resins, impregnating resins, laminating resins, matrix resins and adhesives.

The invention also relates to the use of the mixtures according to the invention for the purposes mentioned above.

The following examples illustrate the invention. Quantities refer to parts by weight unless specified otherwise.

EXAMPLES 1–6:

A. Preparation of the components

Phenol-terminated prepolymer 1A 354 g of anhydrous polypropylene glycol ($M_w$=2,000), 1.8 g of trimethylolpropane and 0.1 ml of dibutyltin dilaurate are added at 100° C. and under nitrogen to 54.4 g of hexamethylene diisocyanate. After the mixture has been stirred at 100° C. for two hours and the isocyanate content has fallen below 4%, this prepolymer is run at 80° C. into 135 g of anhydrous 3,3'-diallylbisphenol A, and the mixture is stirred for 2.5 hours at 80° C. and for 30 minutes at 100° C. until free isocyanate can no longer be detected. This gives a viscous resin having the following analytical data:

viscosity $\eta_{40}$=128,600 mPa s;

phenol content: 2.5 equivalents/kg;

molecular weight (GPC): $M_n$=1260, $M_w/M_n$=11.4.

Butadiene/acrylonitrile copolymer-epoxide resin adduct 1B 730 g of bisphenol A diglycidyl ether (epoxide content 5.4 equivalents/kg), 200 g carboxyl-terminated acrylonitrile/butadiene copolymer (acrylonitrile content 26%, acid number 32 mg of KOH/g), 64 g of bisphenol A and 5 g of triphenylphosphine are heated, in a flask with ground joints equipped with a stirrer, a nitrogen inlet and a reflux condenser, for 3 hours at 130° C. until a viscous resin is formed having an epoxide content of 3.3 equivalents/kg and an Epprecht viscosity of 130,000 mPa s (40° C.).

B. The preparation and testing of adhesive formulations

General working instructions:

The mixtures described in Table I are prepared on a triple-roll mill and are employed to bond degreased, sand-blasted aluminium 1.5 mm thick and degreased steel 1.5 mm thick, the test specimens being cured for 1 hour at 180° C. and having an overlap of 1.25 cm². The T-peel on degreased steel 0.8 mm thick is also measured, curing also being carried out for 1 hour at 180° C. The glass transition temperature is determined by dynamic mechanical spectroscopy on a glassfibre prepreg which has been inpregnated with the adhesive and cured for 1 hour at 180° C., using a Du Pont 9000 thermoanalysis instrument.

TABLE I

| | Adhesive formulations tested Example No. | | | | | |
|---|---|---|---|---|---|---|
| | 1 | 2 | 3 | 4 | 5 | 6 |
| Diglycidyl ether based on bisphenol A (epoxide content 5.4 equivalents/kg) | 70 | 70 | 70 | 70 | 70 | 70 |
| Butanediol diglycidyl ether (epoxide content 9.2 equivalents/kg) | 5 | 5 | 5 | 5 | 5 | 5 |
| Glycidyloxypropyltrimethoxysilane | 0.1 | 0.1 | 0.1 | 0.1 | 0.1 | 0.1 |
| Wollastonite P1 | 30 | 30 | 30 | 30 | 30 | 30 |
| Dicyandiamide | 9.8 | 9.8 | 9.8 | 9.8 | 9.8 | 9.8 |
| Chlortoluron | 0.5 | 0.5 | 0.5 | 0.5 | 0.5 | 0.5 |
| Pyrogenic silica (Aerosil 380) | 0.1 | 0.1 | 0.1 | 0.1 | 0.1 | 0.1 |
| Adduct 1B | 30 | 30 | 30 | 30 | 30 | 30 |
| Phenol-terminated polyurethane 1A | 5 | 15 | 20 | 30 | 50 | 70 |
| (% by weight of polyurethane 1A) | (3.3) | (9.3) | (12.0) | (17.1) | (25.6) | (32.5) |
| Lap shear strength on Al (N/mm²) | 29.2 | 29.5 | 31.5 | 28.4 | 28.7 | 20.3 |
| Lap shear strength on steel (N/mm²) | 23.9 | 26.0 | 25.8 | 26.7 | 22.9 | 18.2 |
| T-peel (N/mm) | <0.5 | 2.3 | 4.0 | 7.8 | 6.3 | 5.0 |
| Fracture (% cohesion failure) | 0 | 0 | 100 | 100 | 100 | |
| Glass transition temperature (°C.) | 104 | 97 | 91 | 87 | 72 | 61 |

EXAMPLES 7-8

Production of castings and determination of their toughness to cracking $G_{Ic}$ A mixture of 200 g of epoxide resin based on bisphenol A (epoxide content 5.4 equivalents/kg), 10 g of butanediol diglycidyl ether (epoxide content 9.2 equivalents/kg), 22.8 g of dicyandiamide, 1.0 g of chlortoluron, 2.0 g of pyrogenic silica and the amounts described in Table II of the components from Examples $A_1$ are and cast to form a sheet measuring 150×60×4 mm, which is cured for 2 hours at 140° C. and for 1 hour at 160° C. The glass temperature (Tg) is determined by means of thermomechanical analysis (TMA). The toughness to cracking $G_{Ic}$ is measured at a variable measuring speed on polished, notched samples measuring 4×10×60 mm by the 3-point bending test method, crack formation being initiated by means of razor-blade notching. The results are shown in Table II.

TABLE II

Toughness to cracking values $G_{Ic}$ of mouldings and toughness to cracking as a function of the speed of rupture

| Ex. No. | Phenol-terminated polyurethane 1A (g) | Acrylonitrile/butadiene epoxide resin adduct 1B (g) | Tg (°C.) | Toughness to cracking $G_{Ic}$ (kJ/m²) as a function of the speed of rupture (m/s) | | | | |
|---|---|---|---|---|---|---|---|---|
| | | | | $2.5 \times 10^{-5}$ | $2.5 \times 10^{-4}$ | $9.7 \times 10^{-2}$ | 0.52 | 1.84 |
| 7 | 20 | 20 | 104 | 2.76 | — | 1.52 | 0.53 | 0.48 |
| 8 | 40 | 40 | 94 | 5.96 | 5.80 | 5.20 | 2.56 | 1.22 |

EXAMPLE 9

A mixture of 30 g of a carboxyl-terminated acrylonitrile/butadiene copolymer (acrylonitrile content 26%, acid number 32 mg of KOH/g), 70 g of butanediol diglycidyl ether and 1.2 g of triphenylphosphine is heated at 150° C. for 2 hours until an adduct having an Epprecht viscosity of 560 mPa s and an epoxide content of 6.0 equivalents/kg has been formed. 15 g of this adduct are mixed on a triple-roll mill with 15 g of the phenol-terminated polyurethane 1A and 5 g of epoxide resin based on bisphenol A (epoxide content 5.4 equivalents/kg), 3 g of aromatic thinner (Actrel 400 ), 8 g of wollastonite P1, 4 g of talc and 0.6 g of pyrogenic silica (Aerosil)380 and also 0.7 g of dicyandiamide and 0.2 g of chlorotoluron. A flexible composition which, when bonded, gives the following values is obtained after curing for 30 minutes at 180° C.:

Lap shear strength on sand-blasted aluminum sheet 1.5 mm thick which has been degreased with acetone: 3.8 N/mm², T-peel on steel 0.8 mm thick which has been degreased with acetone: 1.6 N/mm.

EXAMPLE 10

A mixture of 70 g of epoxide resin based on bisphenol A (epoxide content 5.4 equivalents/kg), 5 g of butanediol diglycidyl ether (epoxide content 9.2 equivalents/kg), 0.1 g of glycidyloxypropyltrimethoxysilane, 7 g of pyrogenic silica, 9.8 g of dicyandiamide, 0.5 g of chlorotoluron, 30 g of wollastonite P1, 30 g of a graft polymer of styrene/acrylonitrile on a polybutadiene microgel (ABS powder, Novodur A90 made by Bayer) and 30 g of the phenol-terminated polyurethane 1A is used to bond aluminum sheets 1.5 mm thick which have been degreased with acetone. The T-peel is determined by bonding steel sheets 0.8 mm thick which have been degreased with acetone.

Lap shear strength on aluminium: 25.2 N/mm²
T-peel on steel: 3.0 N/mm

EXAMPLES 11-15

A. Preparation of the components

Phenol-terminated prepolymer for Example 11

84 g of hexamethylene diisocyanate are initially placed, under nitrogen, in a dry flask with ground joints, and 500 g of anhydrous polypropylene glycol ($M_w$ 2000) are added at 85° C. in the course of one and the mixture is stirred for 2 hours at 100° C. and for 1 hour at 135° C. until an isocyanate content of 3.2% has been reached. This prepolymer is added at 100° C. to a mixture of 155 g of 3,3'-diallylbisphenol A and 0.1 ml of dibutyltin dilaurate. After stirring for 3 hours at 100° C., it is no longer possible to detect free isocyanate, and 500 g of a viscous resin having the following analytical data are obtained:

viscosity $\eta_{40}$=390,000 mPa s;
phenol content: 1.4 equivalents/kg;
molecular weight (GPC): $M_n$=2285, $M_w/M_n$=24.

Phenol-terminated prepolymer for Example 12:

54.4 g of hexamethylene diisocyanate are initially placed under nitrogen in a dry flask with ground joints, 354 g of anhydrous polypropyleneglycol ($M_w$=2000), 1.8 g of trimethylolpropane and 0.1 ml of dibutyltin dilaurate are added successively at 100° C., and the mixture is stirred for 2 hours at 100° C. until an isocyanate content of 3.5% has been reached. This prepolymer is added to a solution of 100 g of bisphenol A in 300 ml of anhydrous dioxane, and the mixture is boiled under reflux for 5 hours. The dioxane is then removed at 100° C./1.33 Pa torr and a viscous resin having the following analytical data is obtained:

viscosity $\eta_{80}$=60,160 mPa s;
molecular weight (GPC): $M_w$=31,500;
phenol content: 1.8 equivalents/kg.

Phenol-terminated prepolymer for Example 13:

40.8 g of hexamethylene diisocyanate are initially placed under nitrogen in a dry flask with ground joints and 265.5 g of anhydrous polybutylene glycol ($M_w$=2000), 1.35 g of trimethylolpropane and 0.1 ml of dibutyltin dilaurate are added, and the mixture is stirred for 2 hours at 100° C. The resulting prepolymer is added at 80° C. to 101.3 g of anhydrous 3,3'-diallylbisphenol A, and the mixture is stirred for 4 hours at 100° C. and for 3 hours at 110° C. until free isocyanate could no longer be detected. This gives a viscous resin having the following analytical data:

viscosity $\eta_{80}$=56,000 mPa s;
molecular weight (GPC): $M_n$=1250, $M_w/M_n$=17;
phenol content: 1.55 equivalents/kg.

Phenol-terminated prepolymer for Example 14:

67.2 g of hexamethylene diisocyanate are initially placed under nitrogen in a dry flask with ground joints and 354 g of anhydrous polypropyleneglycol ($M_w$=2000), 1.8 g of trimethylolpropane and 0.1 ml of dibutyltin dilaurate are added at 85° C. in the course of 15 minutes, and the mixture is stirred for 2 hours at 100° C. This prepolymer is added at 100° C. to 135 g of anhydrous 3,3'-diallylbisphenol A, and the mixture is stirred for 5 hours at 100° C. and for 2 hours at 130° C. This gives a viscous resin having the following analytical data:

viscosity $\eta_{40}$=133,000 mPa s;
molecular weight (GPC): $M_n$=1420, $M_w/M_n$=11.5;
phenol content: 1.6 equivalents/kg.

Phenol-terminated prepolymer for Example 15:

54.4 g of hexamethylene diisocyanate are initially placed under nitrogen in a dry flask with ground joints, 354 g of anhydrous polypropylene glycol ($M_w$=2000), 1.8 g of trimethylolpropane and 0.1 ml of dibutyltin dilaurate are added successively at 100° C., and the mixture is stirred for 2 hours at 100° C. until an isocyanate content of 2.5% has been reached. This prepolymer is then run into a solution of 100 g of bisphenol A in 300 ml of anhydrous dioxane, and the mixture is boiled under reflux for 5 hours. The dioxane is removed in vacuo at 100° C./1.33 Pa, and a viscous resin having the following analytical data is obtained:

viscosity $\eta_{80}$=92,160 mPa s;
molecular weight (GPC): $M_w$=25,260; $M_n$=840, $M_w/M_n$=30;
phenol content: 1.8 equivalents/kg.

B. The preparation and testing of adhesive formulations

General working instructions as in Examples 1-6

TABLE III

| Adhesive formulations tested | | | | | |
|---|---|---|---|---|---|
| | Example No. | | | | |
| | 11 | 12 | 13 | 14 | 15 |
| Diglycidyl ether based on bisphenol A (epoxide content 5.4 equivalents/kg) | 70 | 70 | 70 | 70 | 70 |
| Butanediol diglycidyl ether (epoxide content 9.2 equivalents/kg) | 5 | 5 | 5 | 5 | 5 |
| Glycidyloxypropyltrimethoxysilane | 0.1 | 0.1 | 0.1 | 0.1 | 0.1 |
| Wollastonite P1 | 30 | 30 | 30 | 30 | 30 |
| Dicyandiamide | 9.8 | 9.8 | 9.8 | 9.8 | 9.8 |
| Chlortoluron | 0.5 | 0.5 | 0.5 | 0.5 | 0.5 |
| Pyrogenic silica (Aerosil 380) | 7.0 | 7.0 | 7.0 | 7.0 | 7.0 |
| Adduct 1B | 30 | 30 | 30 | 30 | 30 |
| Phenol-terminated polyurethane | 30 | 30 | 30 | 30 | 30 |
| (% by weight of polyurethane) | 16 | 16 | 16 | 16 | 16 |
| Lap shear strength on Al (N/mm$^2$) | 32.0 | 30.3 | 32.6 | 32.4 | 32.1 |
| Lap shear strength on steel (N/mm$^2$) | 24.0 | 23.4 | 23.6 | 25.2 | 27.7 |
| Angle peeling resistance on steel (N/mm) | 8.7 | 4.5 | 7.4 | 4.9 | 5.7 |
| Fracture (% cohesion failure) | 90 | 80 | 90 | 70 | 40 |
| Glass transition temperature (°C.) | 82 | 97 | 87 | 84 | 94 |

EXAMPLES 16-20

A. Preparation of the phenol-terminated polyurethanes Prepolymer for Example 16:

76 g of isophorone diisocyanate are initially placed under nitrogen in a dry flask with ground joints and 303 g of polybutylene glycol ($M_w$=2000), 1.5 g of trimethylolpropane and 0.1 ml of dibutyltin dilaurate are added successively at 100° C., and the mixture is stirred for 2 hours at 100° C. until an isocyanate content of 3.3% has been reached. This prepolymer is added to 115 g of anhydrous 3,3'-diallylbisphenol A, and the mixture is stirred for 3 hours at 80° C. and for 30 minutes at 105° C. until free isocyanate can no longer be detected. This gives a viscous resin having the following analytical data:

viscosity $\eta_{80}$=64,000 mPa s;
molecular weight (GPC): $M_n$=1740, $M_w/M_n$=8.8;
phenol content: 1.56 equivalents/kg.

Prepolymer for Example 17:

88.8 g of isophorone diisocyanate are initially placed under nitrogen in a dry flask with ground joints and 354 g of polypropylene glycol ($M_w$ 2000), 1.8 g of trimethylolpropane and 0.1 ml of dibutyltin dilaurate are added successively at 100° C. in the course of 15 minutes, and the mixture is stirred for 2 hours at 100° C. until an isocyanate content of 4.0% has been reached. This prepolymer is added to 135 g of anhydrous 3,3'-diallylbisphenol A, and the mixture is stirred for 3 hours at 80° C. and for 30 minutes at 100° C. until free isocyanate can no longer be detected. This gives a viscous resin having the following analytical data:

viscosity $\eta_{80}=12,640$ mPa s;
molecular weight (GPC): $M_n=1630$, $M_w/M_n=7.2$;
phenol content: 1.5 equivalents/kg.

Prepolymer for Example 18:

88.8 g of isophorone diisocyanate are initially placed under nitrogen in a dry flask with ground joints and 354 g of polypropylene glycol ($M_w$ 2000), 1.8 g of trimethylolpropane and 0.1 ml of dibutyltin dilaurate are added successively at 100° C. in the course of 15 minutes, and the mixture is stirred for 2 hours at 100° C. until an isocyanate content of 4.0% has been reached. 44 g of p-aminophenol are then added and the mixture is stirred for 3 hours at 120° C. This gives a viscous resin having the following analytical data:

viscosity $\eta_{80}=42,800$ mPa s;
molecular weight (GPC): $M_n=1090$, $M_w/M_n=5.8$;
phenol content: 0.83 equivalents/kg.

Prepolymer for Example 19:

88.8 g of isophorone diisocyanate are initially placed under nitrogen in a dry flask with ground joints and 354 g of polypropylene glycol ($M_w=2000$), 1.8 g of trimethylolpropane and 0.1 ml of dibutylitin dilaurate are added successively at 100° C. in the course of 15 minutes, and the mixture is stirred for 2 hours at 100° C. until an isocyanate content of 4.0% has been reached. 118 g of bisphenol A are then added, and the mixture is stirred for 3 hours at 120° C. until free isocyanate can no longer be detected. This gives a viscous resin having the following analytical data:

viscosity $\eta_{80}=11,360$ mPa s;
molecular weight (GPC): $M_n=620$, $M_w/M_n=9.3$;
phenol content: 2.4 equivalents/kg.

Prepolymer for Example 20:

70 g of a mixture of toluylene diisocyanate isomers is initially placed under nitrogen in a dry flask with ground joints and 354 g of polypropylene glycol ($M_w$ 2000), 1.8 g of trimethylolpropane and 0.1 ml of dibutyltin dilaurate are added successively at 100° C., and the mixture is stirred for 2 hours at 100° C. until an isocyanate content of 4.0% has been reached. This prepolymer is run at 100° C. into 135 g of diallylbisphenol A, and the mixture is stirred for 3 hours at 100° C. until free isocyanate can no longer be detected. This gives a viscous resin having the following analytical data:

viscosity $\eta_{80}=17,920$ mPa s;
molecular weight (GPC): $M_n=2000$, $M_w/M_n=6.4$;
phenol content: 2.2 equivalents/kg.

B. The preparation and testing of adhesives

The procedure described in Example 1 is followed. In measuring the T-peel on oily steel, the steel specimens 0.8 mm thick are cleansed with acetone, dried at 80° C. in a circulating air oven, then immersed in a mixture of 10 parts of anti-corrosion oil (P80 made by Pfinders Nachf. GmbH & Co. D-7030 Böblingen) and 90 parts of n-heptane, and dried for 10 minutes at 80° C. in a circulating air oven. The results are shown in Table IV.

TABLE IV

| Adhesive formulations tested | | | | | |
|---|---|---|---|---|---|
| | Example No. | | | | |
| | 16 | 17 | 18 | 19 | 20 |
| Diglycidyl ether based on bisphenol A (epoxide content 5.4 equivalents/kg) | 70 | 70 | 70 | 70 | 70 |
| Butanediol diglycidyl ether (epoxide content 9.2 equivalents/kg) | 5 | 5 | 5 | 5 | 5 |

TABLE IV-continued

| Adhesive formulations tested | | | | | |
|---|---|---|---|---|---|
| | Example No. | | | | |
| | 16 | 17 | 18 | 19 | 20 |
| Glycidyloxypropyltrimethoxysilane | 0.1 | 0.1 | 0.1 | 0.1 | 0.1 |
| Wollastonite P1 | 30 | 30 | 30 | 30 | 30 |
| Dicyandiamide | 9.8 | 9.8 | 9.8 | 9.8 | 9.8 |
| Chlortoluron | 0.5 | 0.5 | 0.5 | 0.5 | 0.5 |
| Pyrogenic silica (Aerosil 380) | 7.0 | 7.0 | 7.0 | 7.0 | 7.0 |
| Adduct 1B | 30 | 30 | 30 | 30 | 30 |
| Phenol-terminated polyurethane | 30 | 30 | 30 | 30 | 30 |
| (Gew. % Polyurethane) | 16 | 16 | 16 | 16 | 16 |
| Lap shear strength on Al (N/mm$^2$) | 27.0 | 25.3 | 26.9 | 25.3 | 24.6 |
| Lap shear strength on steel (N/mm$^2$) | 23.4 | 24.6 | 26.4 | 23.9 | 24.0 |
| T-peel on degreased steel (N/mm) | 5.0 | 8.1 | 5.8 | 5.3 | 6.0 |
| (% cohesion failure) | (30) | (90) | (70) | (50) | (30) |
| T-peel on oily steel (N/mm) | 4.9 | 6.9 | 4.9 | 6.5 | 5.4 |
| (% cohesion failure) | (20) | (80) | (30) | (80) | (30) |

EXAMPLES 21-26

A. Preparation of prepolymers

Adduct 23

680 g of the diglycidyl ether of bis-(4-hydroxyphenyl)-methane (epoxide content 5.8 equivalents/kg), 319 g of carboxyl-terminated acrylonitrile/butadiene copolymer (acrylonitrile content 26%, acid number 32 mg of KOH/g) and 1 g of triphenylphosphine are heated for 2 hours at 150° C. in a flask with ground joints equipped with a stirrer, a nitrogen inlet and a reflux condenser until a viscous resin having an epoxide content of 3.5 equivalents/kg has been formed.

Polyurethane adduct 25

750 g of the phenol-terminated prepolymer 1A are heated, together with 248 g of butanediol diglycidyl ether (epoxide content 8.0 equivalents/kg) and 2 g of triphenylphosphine, in a flask with ground joints equipped with a stirrer, a nitrogen inlet and a reflux condenser, for 2 hours at 150° C. until a viscous resin having an epoxide content of 1.26 equivalents/kg has been formed.

B. The preparation and testing of the adhesive mixtures

The mixtures described in Table V are prepared on a triple-roll mill and are employed for bonding oily steel.

Lap shear strength values on oil-treated steel 1403 (thickness 1.5 mm) are determined as specified in DIN 53,283.

T-peel values on oil-treated steel 1403 (thickness 0.6 mm) are determined as specified in DIN 53,282.

Values of elongation at break are determined on standard test specimens of the material by the tensile test ISO R 527.

In all cases curing is carried out for 30 minutes at 180° C.

The energy absorption is determined in a modified falling bolt test (impact peel test), a steel sheet 2 mm thick (150×20 mm) being glued (curing 30 minutes/180° C.) to a perforated steel plate (150×60×20 mm, diameter of perforation 25 mm). The steel sheet is knocked away through this drilled hole by means of a bolt (10.7 kg, diameter 12.6 mm), falling from a height of 2 m, and the absorption of energy is measured at the same time by means of the CEAST falling bolt device.

TABLE V

Adhesive formulations tested

| | Example No. | | | | | |
|---|---|---|---|---|---|---|
| | 21 | 22 | 23 | 24 | 25 | 26 |
| Epoxide resin based on bisphenol A (epoxide content 5.3 equivalents/kg) | 25 | 9 | 25 | 25 | 25 | 25 |
| Epoxide resin based on bis-(4-hydroxyphenyl)-methane (epoxide content 5.8 equivalents/kg) | — | 16 | — | — | — | — |
| Adduct 1B | 32 | 32 | | | | |
| Adduct 23 | — | — | 30 | 30 | 30 | 30 |
| Phenol-terminated polyurethane 1A | 8 | 8 | 8 | — | — | — |
| Phenol-terminated polyurethane 16 | — | — | — | 8 | — | — |
| Adduct 25 | — | — | — | — | 15 | 25 |
| Dicyandiamide | 4.7 | 4.7 | 4.7 | 4.7 | 4.7 | 4.7 |
| Wollastonite | 10 | 10 | 10 | 10 | 10 | 10 |
| Pyrogenic silica (Aerosil ® R 202) | 3 | 3 | 3 | 3 | 3 | 3 |
| Lap shear strength on oily steel (N/mm$^2$) | 25 | 26 | 26 | 27 | 25 | 26 |
| T-peel on oily steel (N/mm) | 5.0 | 6.0 | 4.8 | 5.5 | 5.2 | 7.0 |
| Energy absorption in the impact peel test (J) | 10.5 | 13.0 | 12.3 | 12.0 | 12.9 | 15.0 |
| Elongation at break in the tensile test (%) | 9.0 | 9.0 | 10.0 | 11.0 | 10.0 | 15.0 |

EXAMPLE 27

A mixture of 35 parts of epoxide resin based on bisphenol A (epoxide content 5.3 equivalents/kg), 2.5 parts of butanediol diglycidyl ether (epoxide content 8.0 equivalents/kg), 15 parts of adduct 1B, 0.1 part of glycidyloxypropyltrimethoxysilane, 15 parts of wollastonite, 4.9 parts of dicyandiamide, 0.25 part of chlortoluron, 3.5 parts of pyrogenic silica (Aerosil ® 380) and 15 parts of the phenol-terminated polyurethane 1A is prepared on a triple-roll mill. Curing is carried out for 1 hour at 180° C. The values of T-peel on degreased steel (thickness 0.6 mm) [DIN 53,282] and the tensile elongation characteristics [ISO R 527] are determined.

Angle peel strength: 6.7 N/mm;
Elongation at break: (23° C.) 13.8%; (−30° C.) 5.0%;
Modulus of elasticity: (23° C.) 2.85 GPa; (−30° C.) 3.83 GPa.

The effect of the speed of measurement is also investigated in the case of the angle peel strength values:

| Drawing speed (m/s) | T-peel (N/mm) |
|---|---|
| 0.0025 | 8 |
| 1.99 | 13 |
| 5.01 | 15 |
| 10.0 | 19.3 |

EXAMPLES 28–41

A. Preparation of prepolymers
Adduct 28

438 g of epoxide resin based on bisphenol A (5.3 equivalents/kg), 38.2 g of bisphenol A, 119 g of carboxyl-terminated acrylonitrile/butadiene copolymer (acrylonitrile content 18%, acid number 29 mg of KOH/g) and 4.8 g of triphenylphosphine are heated at 140° C. for 2 hours under nitrogen until a viscous resin having an epoxide content of 3.3 equivalents/kg and a viscosity by Epprecht's method of $\eta_{40} = 74,240$ mPa s has been formed.

Phenol-terminated prepolymer for Example 29

54.4 g of hexamethylene diisocyanate are initially placed, under nitrogen, in a dry flask with ground joints, and a mixture of 200 g of anhydrous anhydrous dihydroxyl-terminated polypropylene glycol ($M_n = 2,000$) and 0.1 ml of dibutyltin dilaurate is added at 100° C. in the course of 60 minutes. 11.0 g of 1,4-cyclohexanedimethanol are then added to this reaction mixture and the latter is stirred for 60 minutes at 100° C. and the prepolymer thus obtained is added, under nitrogen, to 135 g of 3,3′-diallylbisphenol A at 100° C. in the course of 30 minutes. After stirring for three hours at 100° C. free isocyanate can no longer be detected and a viscous resin having the following analytical data is obtained:

viscosity $\eta_{80} = 9,600$ mPa s.

Phenol-terminated prepolymer for Example 30

33.9 g of isophorone diisocyanate and 0.1 ml of dibutyltin dilaurate are initially placed, under nitrogen, in a flask with ground joints, and a mixture of 137 g of anhydrous dihydroxyl-terminated polypropylene glycol ($M_n = 2,000$) and 68.5 g of trihydroxyl-terminated polypropylene glycol ($M_n = 4,000$) is added at 100° C. in the course of 1 hour. After the mixture has been stirred at 100° C. for 2 hours, this prepolymer is added to 50 g of 3,3′-diallylbisphenol A, and the mixture is stirred for 3 hours until free isocyanate can no longer be detected. This gives a viscous resin having the following analytical data:

viscosity $\eta_{40} = 24,600$ mPa s;
phenol content: 1.15 equivalents/kg;
molecular weight (GPC): $M_n = 1,830$, $M_w/N_n = 16$.

Phenol-terminated prepolymer for Example 31

71.8 g of isophorone diisocyanate are initially placed, under nitrogen, in a fry flask with ground joints, a mixture of 354 g of anhydrous dihydroxyl-terminated polytetrahydrofuran ($M_n = 2,000$), 1.8 g of trimethylolpropane and 0.1 ml of dibutyltin dilaurate is added and the mixture is stirred for 2 hours at 100° C. until an isocyanate content of 2.3% has been reached. The prepolymer thus obtained is run into 134 g of 3,3′-diallylbisphenol A at 80° C. After stirring for 3 hours at 80° C., free isocyanate can no longer be detected and a viscous resin having the following analytical data is obtained:

viscosity $\eta_{80} = 37,760$ mPa s;
molecular weight (GPC): $M_n = 1,520$, $M_w/M_n = 13.1$.

Phenol-terminated prepolymer for Example 32

88.8 g of isophorone diisocyanate are initially placed, under nitrogen, in a dry flask with ground joints and a mixture of 354 g of anhydrous dihydroxyl-terminated polycaprolactone ($M_n = 2,000$), 1.8 g of trimethylolpropane and 0.1 ml of dibutyltin dilaurate is added, with stirring, at 80° C. in the course of 30 minutes. After two hours the prepolymer obtained is added to 150 g of 3,3′-diallylbisphenol A, and the mixture is stirred for a further 3 hours at 80° C. until free isocyanate can no longer be detected. This gives a semi-solid resin having the following analytical data:

viscosity $\eta_{80} = 5,760$ mPa s.

Phenol-terminated prepolymer for Example 33

95.4 g of isophorone diisocyanate are initially placed, under nitrogen, in a flask with ground joints and 1.8 g of trimethylolpropane and 0.1 ml of dibutyltin dilaurate are added at 80° C. A mixture of 354 g of dihydroxyl-terminated polypropylene glycol ($M_n = 2,000$) and 80 g of bis-(aminopropyl)-polytetrahydrofuran ($M_n = 750$) is then added at 80° C. in the course of 2 hours, the mixture is allowed to react for 2 hours and, finally, 150 g of 3,3'-diallylbisphenol A are added. After a reaction time of 3 hours at 80° C. free isocyanate can no longer be detected and a viscous resin having the following analytical data is obtained:

viscosity $\eta_{80}=40,960$ mPa s;
molecular weight $M_n=1,200$, $M_w/M_n=18$.

Phenol-terminated prepolymer for Example 34

30 g of bis-(isocyanatopropyl)-polytetrahydrofuran (prepared by phosgenating a bis-(aminopropyl)-tetrahydrofuran of molecular weight 750 and isocyanate content 8.5% which has been neutralized with anhydrous HCl) are added, under nitrogen, to a mixture of 24.6 g of 3,3'-diallylbisphenol A and 0.1 ml of dibutyltin dilaurate in a dry flask with ground joints. Stirring for three hours at 100° C. gives a viscous resin having the following analytical data:

viscosity $\eta_{25}=122,880$ mPa s;
phenol content: 2.88 equivalents/kg.

Phenol-terminated prepolymer for Example 35

10 g of p-aminophenol are added, under nitrogen, to 50 g of bis-(isocyanatopropyl)-polytetrahydrofuran (prepared by phosgenating a bis(aminopropyl)-polytetrahydrofuran of molecular weight 1,100 and isocyanate content 3.1% which has been neutralized with anhydrous HCl) in a dry flask, and the mixture is stirred for 5 hours at 100° C. This gives a viscous resin having the following analytical data:

viscosity: $\eta_{25}=67,840$ mPa s;
phenol content: 2.03 equivalents/kg.

Phenol-terminated prepolymer for Example 36

29.2 g of a diisocyanate-terminated polypropylene glycol (isocyanate content 3.6%, prepared by phosgenating a bisamino-terminated polypropylene glycol of molecular weight 2,000, obtainable as Jeffamine ® D 2000 from Texaco, which has been neutralized with anhydrous HCl) are added, under nitrogen, to a mixture of 10.8 g of 3,3'-diallylbisphenol A and 0.1 ml of dibutyltin dilaurate in a dry flask. Stirring for 6 hours at 100° C. gives a viscous, isocyanate-free resin having the following analytical data:

viscosity: $\eta_{25}=44,160$ mPa s;
phenol content: 1.73 equivalents/kg.

Phenol-terminated prepolymer for Example 37

4.9 g of p-aminophenol are added, under nitrogen, to 44.6 g of diisocyanate-terminated polypropylene glycol (isocyanate content 3.6%, prepared by phosgenating a bisamino-terminated polypropylene glycol of molecular weight 2,000, obtainable as Jeffamine ® D 2000 from Texaco, which has been neutralized with anhydrous HCl) in a dry flask. Stirring for 5 hours at 100° C. gives an isocyanate-free, viscous resin having the following analytical data:

viscosity $\eta_{25}=63,360$ mPa s;
phenol content: 0.96 equivalent/kg.

Mixture of phenol-terminated prepolymers for Example 38

A mixture of 56.5 g of 3,3'-diallylbisphenol A and 0.1 ml of dibutyltin dilaurate is added, under nitrogen, to 20 g of diisocyanate-terminated polypropylene glycol (isocyanate content 20%, prepared by phosgenating Jeffamine ® D 230 made by Texaco) in a dry flask. Stirring for four hours at 100° C. gives a waxy resin having the following analytical data:

viscosity $\eta_{80}=1,520$ mPa s;
phenol content: 4.76 equivalents/kg.

This prepolymer is employed as a mixture (1:3 parts by weight) with the prepolymer described under Example 36.

Phenol-terminated prepolymer for Example 39

5.5 g of p-aminophenol are added, under nitrogen, to 50 g of triisocyanate-terminated polypropylene glycol (isocyanate content 1.6%, prepared by phosgenating the polypropylene glycol triamine of molecular weight 3,000 which can be obtained commercially as Jeffamine ® T 3000), and the mixture is boiled for 5 hours at 100° C. This gives a viscous resin having the following analytical data:

viscosity $\eta_{25}=89,600$ mPa s;
phenol content: 1.0 equivalents/kg.

Phenol-terminated prepolymer for Example 40

A mixture of 15.4 g of 3,3'-diallylbisphenol A and 0.1 ml of dibutyltin dilaurate is added, under nitrogen, to 50 g of triisocyanate-terminated polypropylene glycol (isocyanate content 1.6%, prepared by phosgenating the polypropylene glycol triamine of molecular weight 3,000 which can be obtained commercially as Jeffamine ® T 3000, which has been neutralized with anhydrous HCl), and the mixture is heated for 6 hours at 100° C. and for 2 hours at 140° C. to give an isocyanate-free resin having the following analytical data:

viscosity: $\eta_{25}=87,040$ mPa s;
phenol content: 1.53 equivalents/kg.

Phenol-terminated prepolymer for Example 41

A mixture of 68.2 g of 3,3'-diallylbisphenol A and 200 g of bisamino-terminated polypropylene glycol ($M_n=2,000$; obtainable as Jeffamine ® D 2000 from Texaco) is added, under nitrogen, to 33.6 g of isophorone diisocyanate at room temperature, with stirring. When the exothermic reaction has subsided, 0.1 ml of dibutyltin dilaurate is added and the mixture is stirred for 3 hours at 100° C. This gives an isocyanate-free, high-viscosity resin having the following analytical data:

viscosity: $\eta_{120}=5,120$ mPa s;
phenol content: 1.45 equivalents/kg.

Phenol-terminated prepolymer for Example 42

A mixture of 313 g of hydroxyl-terminated polyalkylene ether, grafted with styrene/acrylonitrile (Niax ® 24-32 made by Union Carbide), 0.1 ml of dibutyltin dilaurate and 0.9 g of trimethylolpropane is added, under nitrogen, to 27.2 g of hexamethylene diisocyanate at 100° C. in the course of one hour. After a further two hours, this isocyanate-terminated prepolymer is added to 68.0 g of diallylbisphenol A, and the mixture is stirred for 3 hours at 100° C. until free isocyanate can no longer be detected. This gives a phenol-terminated graft polymer having the following analytical data:

viscosity (Epprecht): 40,900 mPa s (80° C.).

Phenol-terminated prepolymer for Example 43

A mixture of 12.5 g of acrylonitrile, 37.5 g of styrene and 0.5 g of azoisobutyronitrile is added, under nitrogen, to 354 g of dihydroxyl-terminated polypropylene glycol ($M_w=2,000$) at 75° C. in the course of 2 hours, and the mixture is allowed to react for four hours at an internal temperature of 80°–85° C. After 0.1 ml of dibutyltin dilaurate has been added, the graft polymer is run, at 100° C. and in the course of 1 hour, into 54.4 g of hexamethylene diisocyanate. After the mixture has been stirred for 3 hours at 100° C., the isocyanate-terminated graft polymer thus obtained is added to 135 g of o,o'-diallylbisphenol A, and the mixture is allowed to react for two hours at 100° C. This gives a resin having the following analytical data:

viscosity (Epprecht): 158,720 mPa s (40° C.);
phenol content: 1.7 equivalents/kg.

Phenol-terminated prepolymer for Example 44

The procedure of Example 43 is repeated, except that a mixture of 50 g of styrene and 0.5 g of azoisobutyronitrile is added in the grafting operation, and a phenol-containing resin having the following analytical data is obtained:

viscosity (Epprecht): 143,360 mPa s (40° C.);
phenol content: 1.6 equivalents/kg.

Phenol-terminated prepolymer for Example 45

88 g of isophorone diisocyanate are initially placed, under nitrogen, in a dry flask with ground joints, and a mixture of 25 g of hydroxyl-terminated polybutadiene (ARCO RD45HT) and 0.1 ml of dibutyltin dilaurate is added, with stirring, at 100° C. in the course of 1 hour. After the mixture has been stirred for 1 hour, 300 g of anhydrous dihydroxyl-terminated polybutylene glycol ($M_n = 2,000$) are added in the course of 1 hour, and the mixture is then stirred for 2 hours at 100° C. The isocyanate-terminated prepolymer thus obtained is added, with the exclusion of moisture, to 150 g of 3,3'-diallyl-bisphenol A. Stirring for 3 hours at 100° C. gives a viscous, isocyanate-free resin having the following analytical data:

viscosity (Epprecht): $\eta_{80} = 56,320$ mPa s;
phenol content: 1.68 equivalents/kg;
molecular weight (CPC): $M_n = 1,700$, $M_w/M_n = 90$.

Phenol-terminated prepolymer for Example 46

The preparation of the prepolymer is carried out analogously to Example 45, but using 50 g of hydroxyl-terminated polybutadiene (ARCO RD45HT) and 250 g of polybutylene glycol. This gives a viscous, isocyanate-free resin having the following analytical data:

viscosity (Epprecht): $\eta_{80} = 84,480$ mPa s;
phenol content: 1.76 equivalents/kg;
molecular weight (GPC): $M_n = 1,890$, $M_w/M_n = 9.1$.

B. The preparation and testing of adhesives

The procedure described in Example 1 is followed. The results, and the compositions of the individual adhesive mixtures, are shown in Table VI below.

TABLE VI

| | Adhesive formulations tested Example No. | | | | | | | | | | | | | | | | | | |
|---|---|---|---|---|---|---|---|---|---|---|---|---|---|---|---|---|---|---|---|
| | 28 | 29 | 30 | 31 | 32 | 33 | 34 | 35 | 36 | 37 | 38 | 39 | 40 | 41 | 42 | 43 | 44 | 45 | 46 |
| Epoxide resin based on bisphenol A (5.4 equivalents/kg) | 35 | 35 | 35 | 35 | 35 | 35 | 35 | 35 | 35 | 35 | 35 | 35 | 35 | 35 | 70 | 70 | 70 | 35 | 35 |
| Butanediol diglycidyl ether (epoxide content 9.2 equivalents/kg) | 2.5 | 2.5 | 2.5 | 2.5 | 2.5 | 2.5 | 2.5 | 2.5 | 2.5 | 2.5 | 2.5 | 2.5 | 2.5 | 2.5 | 5 | 5 | 5 | 2.5 | 2.5 |
| Glycidyloxypropyltrimethoxysilane | 0.05 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | — | — |
| Wollastonite | 15 | 15 | 15 | 15 | 15 | 15 | 15 | 15 | 15 | 15 | 15 | 15 | 15 | 15 | 30 | 30 | 30 | 15 | 15 |
| Dicyandiamide | 4.9 | 4.9 | 4.9 | 4.9 | 4.9 | 4.9 | 4.9 | 4.9 | 4.9 | 4.9 | 4.9 | 4.9 | 4.9 | 4.9 | 9.8 | 9.8 | 9.8 | 4.9 | 4.9 |
| Chlortoluron | 0.25 | 0.25 | 0.25 | 0.25 | 0.25 | 0.25 | 0.25 | 0.25 | 0.25 | 0.25 | 0.25 | 0.25 | 0.25 | 0.25 | 0.5 | 0.5 | 0.5 | 0.25 | 0.25 |
| Pyrogenic silica | 3.5 | 3.5 | 3.5 | 3.5 | 3.5 | 3.5 | 3.5 | 3.5 | 3.5 | 3.5 | 3.5 | 3.5 | 3.5 | 3.5 | 7.0 | 7.0 | 7.0 | 3.5 | 3.5 |
| Prepolymer A1 | 15 | — | — | — | — | — | — | — | — | — | — | — | — | — | — | — | — | — | — |
| Adduct 1B | — | 15 | 15 | 15 | 15 | 15 | 15 | 15 | 15 | 15 | 15 | 15 | 15 | 15 | 30 | 30 | 30 | 15 | 15 |
| Adduct 28 | 15 | — | — | — | — | — | — | — | — | — | — | — | — | — | — | — | — | — | — |
| Phenol-terminated prepolymer | — | 15 | 15 | 15 | 15 | 15 | 15 | 15 | 15 | 15 | 16 4 + 12 | 15 | 15 | 15 | 30 | 30 | 30 | 15 | 15 |
| Lap shear strength on A1 (N/mm²) | 28.7 | 31.3 | 31.3 | 31.1 | 28.5 | 33.1 | 32.9 | 37.8 | 30.1 | 32.0 | 28.5 | 33.7 | 34.6 | 32.3 | 29.7 | 24.4 | 26.2 | 31.6 | 29.3 |
| Lap shear strength on steel (N/mm²) | 22.3 | 25.2 | 26.2 | 25.6 | 21.3 | 26.5 | 27.1 | 31.9 | 27.3 | 26.8 | 25.4 | 27.9 | 29.3 | 27.8 | 23.5 | 24.8 | 26.3 | 23.9 | 21.3 |
| T-peel (N/mm) | 5.9 | 4.2 | 6.4 | 6.4 | 2.7 | 5.3 | 3.7 | 3.5 | 6.6 | 6.2 | 7.6 | 4.5 | 8.4 | 3.6 | 4.8 | 8.2 | 6.1 | 5.2 | 6.9 |

What is claimed is:

1. A composition containing
A) a copolymer based on at least one 1,3-diene and at least one polar, ethylenically unsaturated comonomer,
B) a phenol-terminated polyurethane, polyurea or polyurea-urethane of the formula I

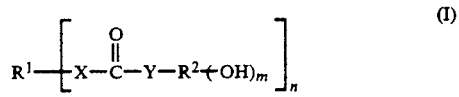
(I)

in which m is 1 or 2, n is 2 to 6, $R^1$ is then n-valent radical of an elastomeric prepolymer, after the removal of the terminal isocyanate, amino or hydroxyl groups, which is soluble or dispersible in epoxide resins, X and Y independently of one another are —O— or —NR³—, it being necessary for at least one of these groups to be —NR³—, R² is an m+1—valent radical of a polyphenol or aminophenol after the removal of the phenolic hydroxyl group(s) or the amino group or both the amino group and the phenolic hydroxy group, respectively and R³ is hydrogen, C₁-C₆alkyl or phenyl and wherein the ratio by weight of A) to B) is from 5:1 to 1:5, and C) an epoxide resin having at least two 1,2-epoxide groups per molecule; or a composition containing (i) an adduct formed from component A) and an epoxide resin, (ii) component B and (iii) component C); or a composition containing (i) component A), (ii) an adduct formed from component B) and an epoxide resin, and (iii) component C); or a composition containing (i) an adduct formed from component A) and an epoxide resin, (ii) an adduct formed from component B) and an epoxide resin, and (iii) component C).

2. A composition according to claim 1, wherein component A) is a copolymer based on 1,3-butadiene.

3. A composition according to claim 1, wherein component A) is a copolymer based on 1,3-butadiene/acrylonitrile, 1,3-butadiene/(meth)acrylic acid esters, 1,3-butadiene/methacrylic acid esters, a 1,3-butadiene/acrylonitrile/styrene graft copolymer (ABS) or a 1,3-butadiene/methyl methacrylate/styrene graft copolymer (MBS).

4. A composition according to claim 1, wherein component A) is a liquid 1,3-butadiene/acrylonitrile copolymer.

5. A composition according to claim 1, wherein component A) is employed in the form of an adduct, of a 1,3-butadiene/acrylonitrile copolymer having functional groups which are reactive towards epoxide resins, onto an epoxide resin.

6. A composition according to claim 1, in which the radical R² is derived from a bisphenol of the formula VI

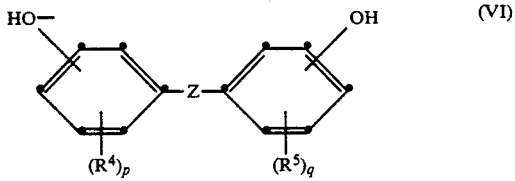

in which Z is a direct C-C bond or a bridge member selected from the group consisting of CR⁶R⁷, —O—, —S—, —SO₂—, —CO—, —COO—, —CONR⁸— and —SiR⁹R¹⁰—, R⁴ and R⁵ independently of one another are C₁-C₂₀alkyl, C₂-C₆alkenyl, C₂-C₆alkynyl or halogen, p and q independently of one another are 0, 1 or 2, R⁶, R⁷ and R⁸ independently of one another are hydrogen, —CF₃ or C₁-C₆alkyl, or R⁶ and R⁷, together with the common C atom, form a cycloaliphatic radical having 5-12 ring C atoms, and R⁹ and R¹⁰ are C₁-C₆alkyl.

7. A composition according to claim 1, wherein X is —NH— and Y is —NH— or —O—.

8. A composition according to claim 1, wherein component B) is a compound of the formula I which is free from isocyanate groups, contains at least two free phenolic hydroxyl groups and can be obtained by reacting a) a prepolymer polyisocyanate which a1) is an adduct of a polyisocyanate onto a polyhydroxyl or polysulfhydryl prepolymer or a mixture of such prepolymers, or a2) is derived from a prepolymer polyether amine, with b) at least one phenol having two or three phenolic hydroxyl groups or an aminophenol having one or two phenolic hydroxyl groups.

9. A composition according to claim 8, wherein the polyhydroxyl prepolymer for the preparation of component a1) is a hydroxyl-terminated polyether or polyester.

10. A composition according to claim 8, wherein the polyhydroxyl prepolymer for the preparation of component a1) is a mixture of a hydroxyl-terminated polybutadiene and a hydroxyl-terminated polyalkylene glycol, or is a hydroxyl-terminated polyalkylene glycol having grafted-thereon 1-olefins.

11. A composition according to claim 8, wherein the polyisocyanate for the preparation of the component a1) is an aliphatic or cycloaliphatic diisocyanate.

12. A composition according to claim 1, wherein component B) is a phenol-terminated polyurethane of the formula VII

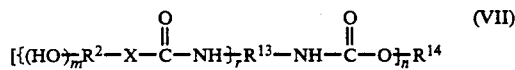

in which R², m and n are as defined in claim 1, r is an integer between 1 and 3, X is —O— or —NH—, R¹³ is the r+1-valent radical of an aliphatic, cycloaliphatic, aromatic or araliphatic polyisocyanate after the removal of the isocyanate groups, R¹⁴ is an n-valent, hydroxyl-terminated polyester or polyether radical after the removal of the terminal OH groups, subject to the proviso that the index m and the radicals R² and R¹³ can be different within a given molecule.

13. A composition according to claim 8, wherein component B) can be obtained by reacting a1) an adduct of a diisocyanate with a mixture of a dihydroxyl-terminated or trihydroxyl-terminated polyether or polyester and less than 1%, relative to the hydroxyl-terminated polyether or polyester, of a diol or triol, and b1) a bisphenol or trisphenol.

14. A composition according to claim 1, containing, as the component B), phenol-terminated polyurea-urethanes of the formula IX

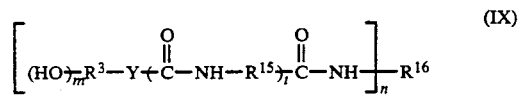

in which R³, m and n are as defined in claim 1, Y is —O— or —NH—, t is 0 or 1, R¹⁵ is the divalent radical of an aliphatic, cycloaliphatic, aromatic or araliphatic diisocyanate, after the removal of the isocyanate groups, and R¹⁶ is the n-valent radical of an amino-terminated polyalkylene ether, after the removal of the terminal NH₂ group.

15. A composition according to claim 14, wherein m is 1, n is 2 or 3, Y is —O—, R¹⁵ is derived from an aliphatic, cycloaliphatic or aromatic diisocyanate and R¹⁶ is a divalent or trivalent radical of an amino-terminated polyalkylene ether after the removal of the terminal amino groups.

16. A composition according to claim 1, wherein component B) is a compound of the formula I which is free from isocyanate groups, contains at least two free phenolic hydroxyl groups and can be obtained by reaction a) a polyisocyanate prepolymer which a1) is an adduct of a polyisocyanate onto a polyhydroxyl or polysulfhydryl prepolymer or a mixture of such prepolymers, in combination with a chain lengthener, or a2) is derived from a prepolymer polyether amine, with b) at least one phenol having two or three phenolic hydroxyl groups or an aminophenol having one or two phenolic hydroxyl groups.

17. A composition according to claim 1, wherein component C) is a diglycidyl ether of bisphenol, a polyglycidyl ether of a novolak formed by reacting formaldehyde with a phenol, a diglycidyl ether of an aliphatic diol, or an adduct of a diglycidyl ether of an aliphatic diol with bisphenol A.

18. A cured product obtained by curing the compositions according to claim 1.

* * * * *